(12) United States Patent
Wong et al.

(10) Patent No.: US 12,175,062 B2
(45) Date of Patent: *Dec. 24, 2024

(54) MANAGING AN IMMERSIVE INTERFACE IN A MULTI-APPLICATION IMMERSIVE ENVIRONMENT

(71) Applicant: Microsoft Technology Licensing, LLC, Redmond, WA (US)

(72) Inventors: Tsz Yan Wong, Seattle, WA (US); Jesse Clay Satterfield, Seattle, WA (US); Nils A. Sundelin, Duvall, WA (US); Bret P. Anderson, Kirkland, WA (US); Patrice L. Miner, Kirkland, WA (US); Chaitanya Dev Sareen, Seattle, WA (US); Robert J. Jarrett, Snohomish, WA (US); Jennifer Nan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,241

(22) Filed: May 17, 2023

(65) Prior Publication Data

US 2023/0289048 A1 Sep. 14, 2023

Related U.S. Application Data

(63) Continuation of application No. 15/341,840, filed on Nov. 2, 2016, now Pat. No. 11,698,721, which is a continuation of application No. 13/657,621, filed on Oct. 22, 2012, now Pat. No. 9,535,597, which is a continuation of application No. 13/118,321, filed on May 27, 2011, now abandoned, and a continuation of application No. 13/118,333, filed on May 27, 2011, now Pat. No. 9,158,445.

(51) Int. Cl.
*G06F 3/04883* (2022.01)
*G06F 3/0481* (2022.01)
*G06F 3/04845* (2022.01)
*G06F 3/0488* (2022.01)
*G06F 3/04886* (2022.01)

(52) U.S. Cl.
CPC ........ *G06F 3/04845* (2013.01); *G06F 3/0481* (2013.01); *G06F 3/0488* (2013.01); *G06F 3/04883* (2013.01); *G06F 3/04886* (2013.01)

(58) Field of Classification Search
CPC ............... G06F 3/0482; G06F 3/04883; G06F 3/04886; G06F 3/0481; G06F 3/04845; G06F 3/04842
See application file for complete search history.

(56) References Cited

U.S. PATENT DOCUMENTS

| 5,305,435 | A  | * | 4/1994  | Bronson  | G06F 3/0481  |
|           |    |   |         |          | 715/788      |
| 8,291,344 | B2 | * | 10/2012 | Chaudhri | G06F 3/0488  |
|           |    |   |         |          | 715/845      |
| 9,244,606 | B2 | * | 1/2016  | Kocienda | G06F 3/0482  |
| 9,329,774 | B2 | * | 5/2016  | Sareen   | G06F 3/04886 |

(Continued)

*Primary Examiner* — Dino Kujundzic

(57) ABSTRACT

This document describes techniques and apparatuses for managing an immersive interface in a multi-application immersive environment. In some embodiments, these techniques and apparatuses enable a user to alter sizes and/or a layout of multiple immersive interfaces with as little as one selection.

20 Claims, 25 Drawing Sheets

(56) References Cited

U.S. PATENT DOCUMENTS

| | | | |
|---|---|---|---|
| 2007/0220444 A1* | 9/2007 | Sunday | G06F 3/0488 |
| | | | 715/788 |
| 2009/0094562 A1* | 4/2009 | Jeong | G06F 3/04883 |
| | | | 715/863 |
| 2010/0066698 A1* | 3/2010 | Seo | G06F 9/4843 |
| | | | 715/761 |
| 2010/0185989 A1* | 7/2010 | Shiplacoff | G06F 3/0416 |
| | | | 345/173 |
| 2012/0180001 A1* | 7/2012 | Griffin | G06F 3/04883 |
| | | | 715/863 |

* cited by examiner

1900 →

1902
Enable Selection to Alter a Size of a First Immersive Interface in a Multi-Application Immersive Environment in Which a Second Immersive Interface is also Displayed

↓

1904
Responsive to Selection to Alter the Size of the First Immersive Interface, Alter Sizes of the First and Second Immersive Interfaces

Fig. 19

MANAGING AN IMMERSIVE INTERFACE IN A MULTI-APPLICATION IMMERSIVE ENVIRONMENT

RELATED APPLICATIONS

This application is a continuation of U.S. patent application Ser. No. 15/341,840 filed Nov. 2, 2016, which is a continuation of U.S. patent application Ser. No. 13/657,621 filed Oct. 22, 2012, now Issued U.S. Pat. No. 9,535,597, which is a continuation of U.S. patent application Ser. No. 13/118,333 filed May 27, 2011, now U.S. Pat. No. 9,158,445, and a continuation of U.S. patent application Ser. No. 13/118,321 filed May 27, 2011, the disclosures of each of which are incorporated by reference herein in their entirety. To the extent appropriate a claim of priority is made to each of the above-disclosed applications.

BACKGROUND

Conventional techniques permit users to view multiple computing applications through multiple windows. Each of these windows generally includes a frame having controls for moving, sizing, or otherwise managing the layout of the window. Moving, sizing, or otherwise managing windows through these controls, however, can be time consuming or result in a poor user experience.

SUMMARY

This document describes techniques and apparatuses for managing an immersive interface in a multi-application immersive environment. In some embodiments, these techniques and apparatuses enable a user to alter sizes and/or a layout of multiple immersive interfaces with as little as one selection.

This summary is provided to introduce simplified concepts for managing an immersive interface in a multi-application immersive environment that are further described below in the Detailed Description. This summary is not intended to identify essential features of the claimed subject matter, nor is it intended for use in determining the scope of the claimed subject matter. Techniques and/or apparatuses for managing an immersive interface in a multi-application immersive environment are also referred to herein separately or in conjunction as the "techniques" as permitted by the context, though techniques may include or instead represent other aspects described herein.

BRIEF DESCRIPTION OF THE DRAWINGS

Embodiments for managing an immersive interface in a multi-application immersive environment are described with reference to the following drawings. The same numbers are used throughout the drawings to reference like features and components:

FIG. 19 illustrates a method for managing an immersive interface in a multi-application immersive environment, including altering sizes of multiple immersive interfaces responsive to a single selection.

DETAILED DESCRIPTION

Overview

This document describes techniques and apparatuses for managing an immersive interface in a multi-application immersive environment. These techniques, in some embodiments, enable a user to quickly and easily size, select, and layout one or multiple immersive interfaces.

Consider first a conventional case where a user wishes to view two applications using as much of her display as possible when working in a windows-based environment. To view her two applications using as much display as possible, she will likely need to find a sizing control on one of the windows, carefully drag out the sizing control to expand the window, and then move the window to the desired area of the display. After doing so, she may then selects the other window to make it primary and thus interact with it, then move the window, then find and select the sizing control on the window, and then drag the sizing control to expand the window. Even after doing so, there can be parts of the display not occupied by one of the windows or some overlap of the windows, thereby occluding a window. Further, some of her display will be taken up with frames of the windows that might otherwise have been used to view content of the applications. Furthermore, in some cases an application can be unaware of the size at which an interface is displayed, thereby further causing content to be laid out in a less-than-optimal fashion.

Assume again that the user wishes to view two applications using as much of her display as possible. In contrast to the conventional case, however, she is working in a multi-application immersive environment managed by the described techniques. In this example, her display is occupied by a single immersive user interface occupying all or nearly all of her display as part of the multi-application immersive environment. To view the two applications, the techniques enable the user to simply select the other application in response to which an immersive interface for the other application will automatically be sized to fit a region of the multi-application immersive environment and the currently displayed immersive interface resized to fit another region of the environment.

The techniques also enable the user to resize interfaces for applications that are already presented. Assume in this second case that both of the two applications are part of the multi-application immersive environment and that the user wishes to change their sizes. The techniques permit her to resize both of them simultaneously with as little as one simple selection. She may slide an immersive interface divider between the two immersive interfaces, for example, with a simple select-and-move gesture. In response, the techniques resize both immersive interfaces.

These are but two examples of many ways in which the techniques enabling managing an immersive interface in a multi-application immersive environment, others of which are described below.

Example System

Figure 1:
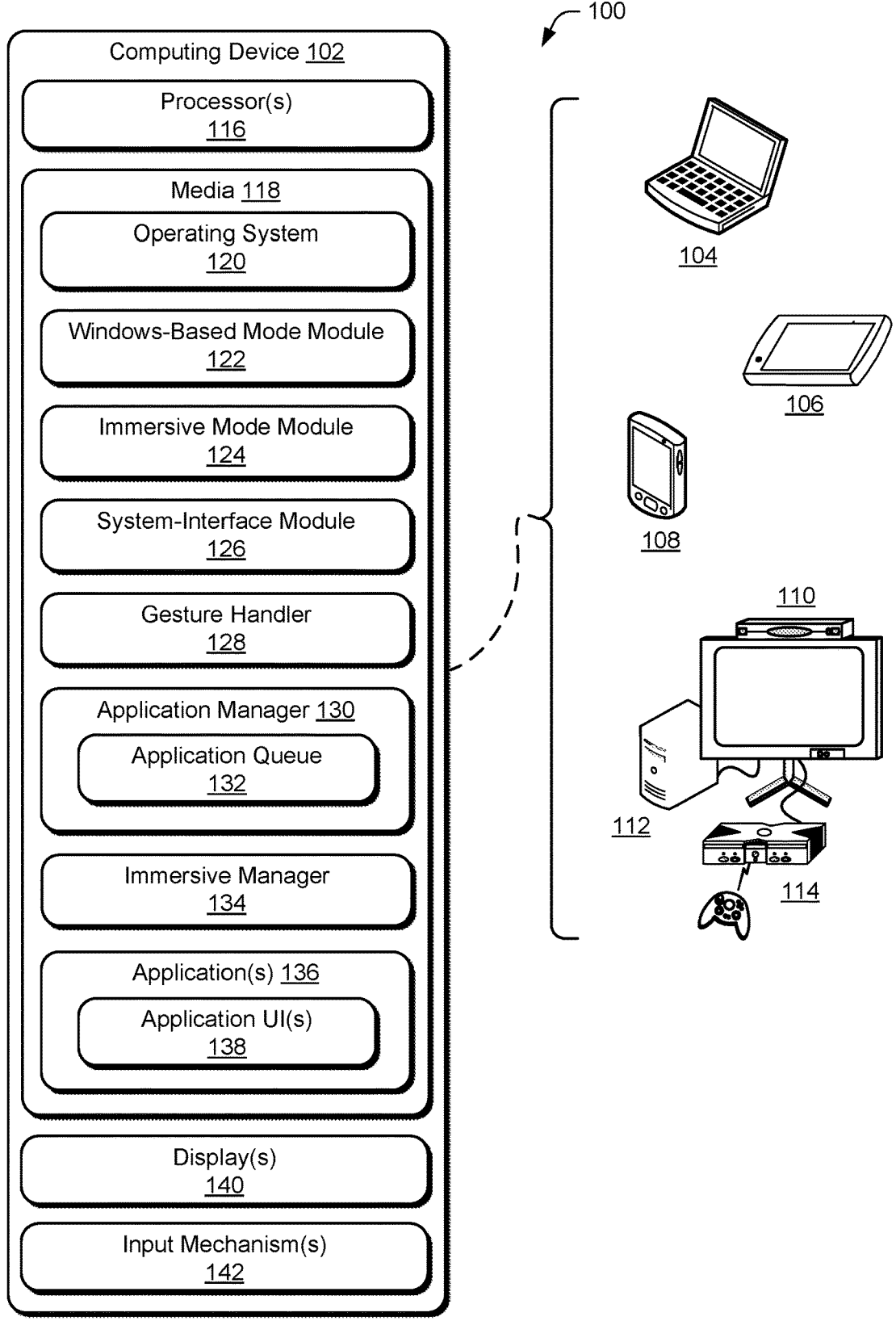
FIG. 1 illustrates an example system in which techniques for managing an immersive interface in a multi-application immersive environment can be implemented.

FIG. 1 illustrates an example system 100 in which techniques for managing an immersive interface in a multi-application immersive environment can be embodied. System 100 includes a computing device 102, which is illustrated with six examples: a laptop computer 104, a tablet computer 106, a smart phone 108, a set-top box 110, a desktop computer 112, and a gaming device 114, though other computing devices and systems, such as servers and netbooks, may also be used.

Computing device 102 includes computer processor(s) 116 and computer-readable storage media 118 (media 118). Media 118 includes an operating system 120, windows-based mode module 122, immersive mode module 124, system-interface module 126, gesture handler 128, application manager 130, which includes or has access to application queue 132, immersive manager 134, and one or more applications 136, each having one or more application user interfaces 138.

Computing device 102 also includes or has access to one or more displays 140 and input mechanisms 142. Four example displays are illustrated in FIG. 1. Input mechanisms 142 may include gesture-sensitive sensors and devices, such as touch-based sensors and movement-tracking sensors (e.g., camera-based), as well as mice (free-standing or integral with a keyboard), track pads, and microphones with accompanying voice recognition software, to name a few. Input mechanisms 142 may be separate or integral with displays 140; integral examples include gesture-sensitive displays with integrated touch-sensitive or motion-sensitive sensors.

Windows-based mode module 122 presents application user interfaces 138 through windows having frames. These frames may provide controls through which to interact with an application and/or controls enabling a user to move and resize the window.

Immersive mode module 124 provides an environment by which a user may view and interact with one or more of applications 136 through application user interfaces 138. In some embodiments, this environment presents content of, and enables interaction with, applications with little or no window frame and/or without a need for a user to manage a window frame's layout or primacy relative to other windows (e.g., which window is active or up front) or manually size or position application user interfaces 138.

This environment can be, but is not required to be, hosted and/or surfaced without use of a windows-based desktop environment. Thus, in some cases immersive mode module 124 presents an immersive environment that is not a window (even one without a substantial frame) and precludes usage of desktop-like displays (e.g., a taskbar). Further still, in some embodiments this immersive environment is similar to an operating system in that it is not closeable or capable of being un-installed. While not required, in some cases this immersive environment enables use of all or nearly all of the pixels of a display by applications. Examples of immersive environments are provided below as part of describing the techniques, though they are not exhaustive or intended to limit the techniques described herein.

System-interface module 126 provides one or more interfaces through which interaction with operating system 120 is enabled, such as an application-launching interface, a start menu, or a system tools or options menu, to name just a few.

Operating system 120, modules 122, 124, and 126, as well as gesture handler 128, application manager 130, and immersive manager 134 can be separate from each other or combined or integrated in any suitable form.

Example Methods

Example methods 200, 800, and 900 address edge gestures, example methods 1400 and 1700 address switching back to a previously-interacted-with application, and example methods 1900 and 2200 address managing an immersive interface in a multi-application immersive environment. The methods may be used separately or in combination with each other, in whole or in part. For example, an edge gesture may be used to select and size applications in a multi-application immersive environment. Or an application queue may be used to select a previously-interacted-with application which is then sized to fit a region of the multi-application immersive environment. Use of an edge gesture or an application queue, however, is not required by methods 1900 and/or 2200.

Figure 2:
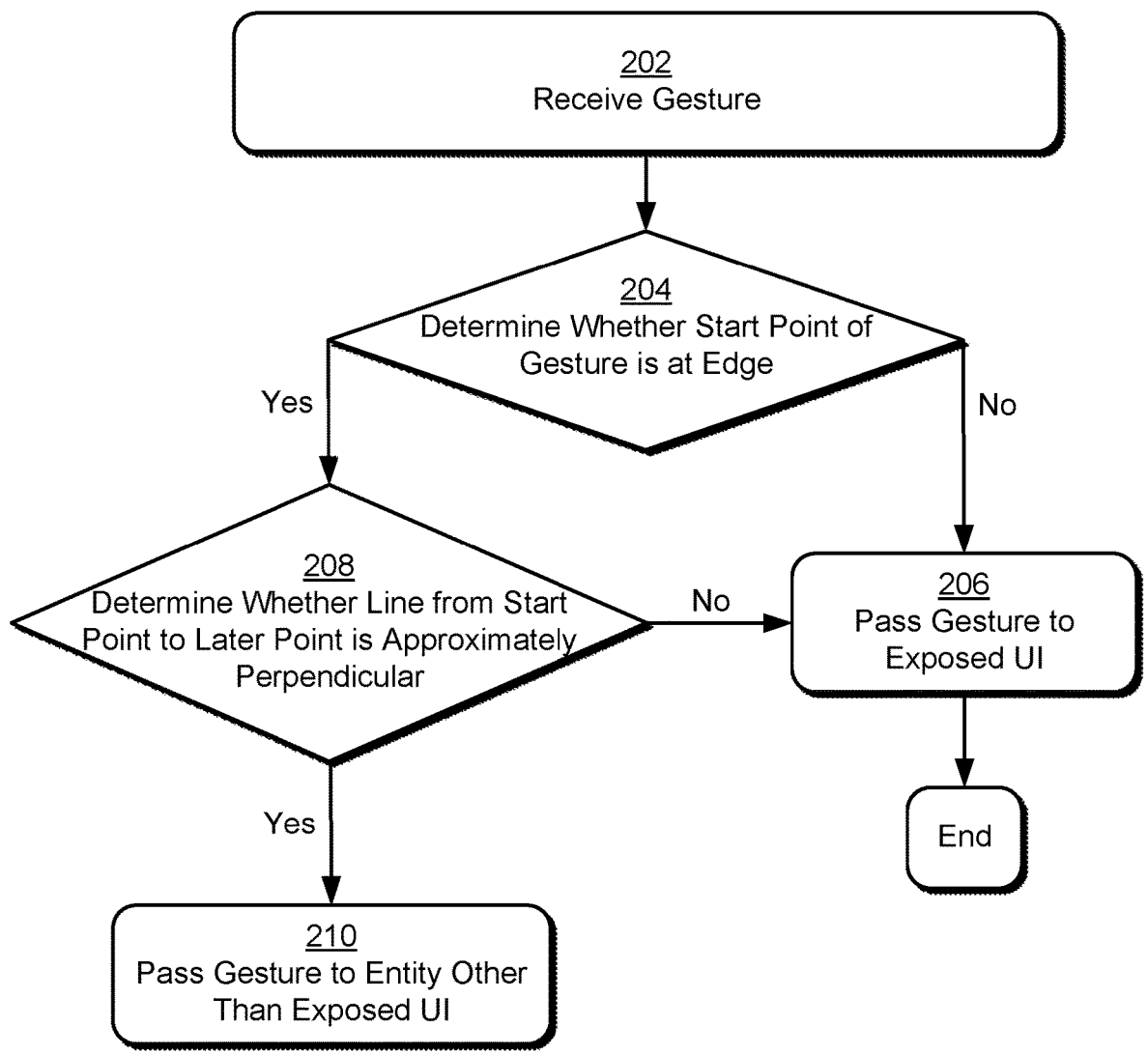
FIG. 2 illustrates an example method for enabling edge gestures that can be used to select to switch back to a previously-interacted-with application, the edge gestures being approximately perpendicular to an edge in which the gesture begins.

FIG. 2 depicts a method 200 for enabling edge gestures based on the edge gesture being approximately perpendicular to an edge in which the gesture begins. In portions of the following discussion reference may be made to system 100 of FIG. 1, reference to which is made for example only.

Block 202 receives a gesture. This gesture may be received at various parts of a display, such as over a windows-based interface, an immersive interface, or no interface. Further, this gesture may be made and received in various manners, such as a pointer tracking a movement received through a touch pad, mouse, or roller ball or a physical movement made with arm(s), finger(s), or a stylus received through a motion-sensitive or touch-sensitive mechanism.

Figure 3:
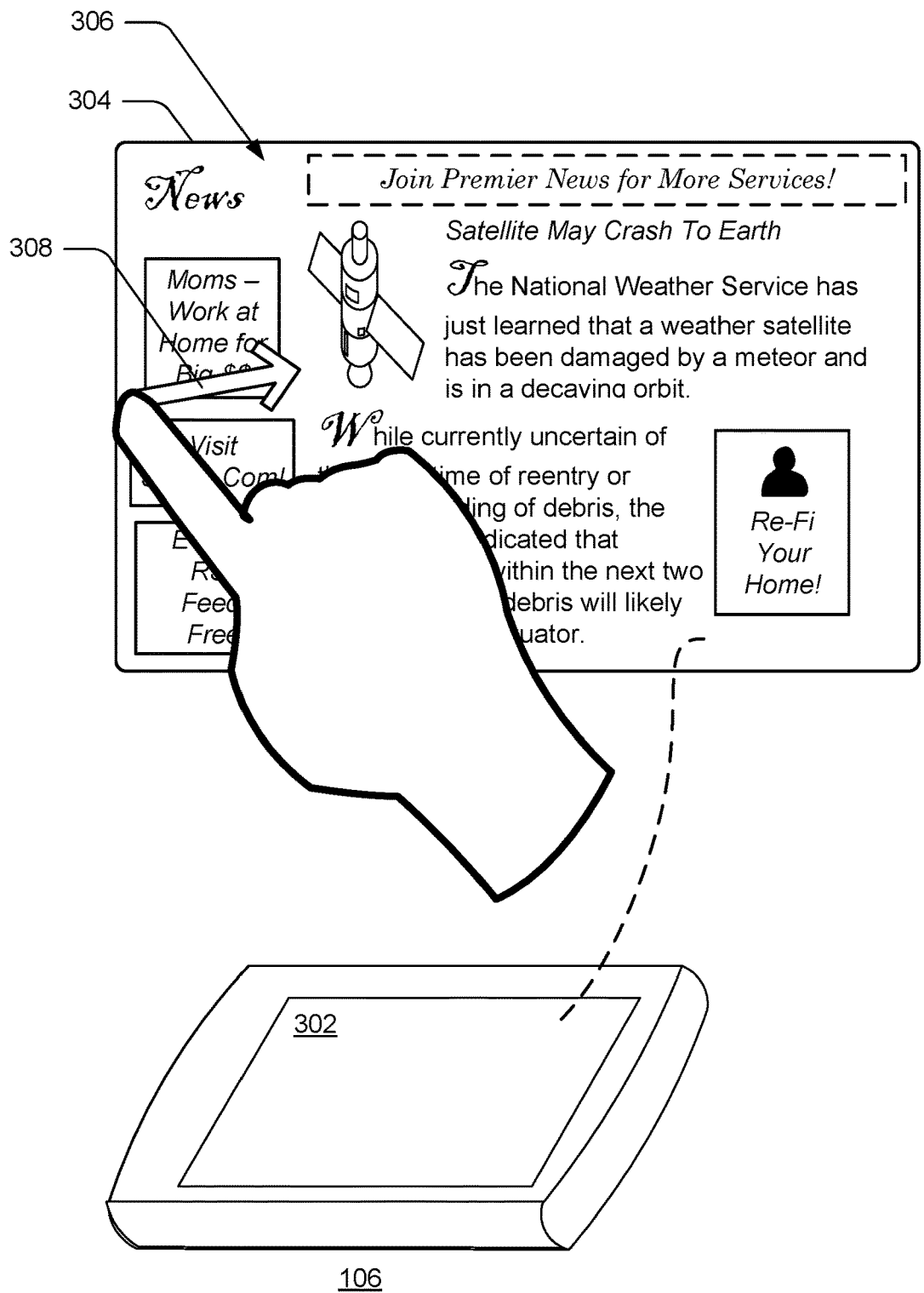
FIG. 3 illustrates an example tablet computing device having a touch-sensitive display presenting an immersive interface.

By way of example consider FIG. 3, which illustrates a tablet computing device 106. Tablet 106 includes a touch-sensitive display 302 shown displaying an immersive interface 304 that includes a webpage 306. As part of an ongoing example, at block 202 gesture handler 128 receives gesture 308 as shown in FIG. 3.

Block 204 determines whether a start point of the gesture is at an edge. As noted above, the edge in question can be an edge of a user interface, whether immersive or windows-based, and/or of a display. In some cases, of course, an edge of a user interface is also an edge of a display. The size of the edge can vary based on various factors about the display or interface. A small display or interface may have a smaller size in absolute or pixel terms than a large display or interface. A highly sensitive input mechanism permits a smaller edge as well. Example edges are rectangular and vary between one and twenty pixels in one dimension and an interface limit of the interface or display in the other dimension, though other sizes and shapes, including convex and concave edges may instead be used.

Figure 4:
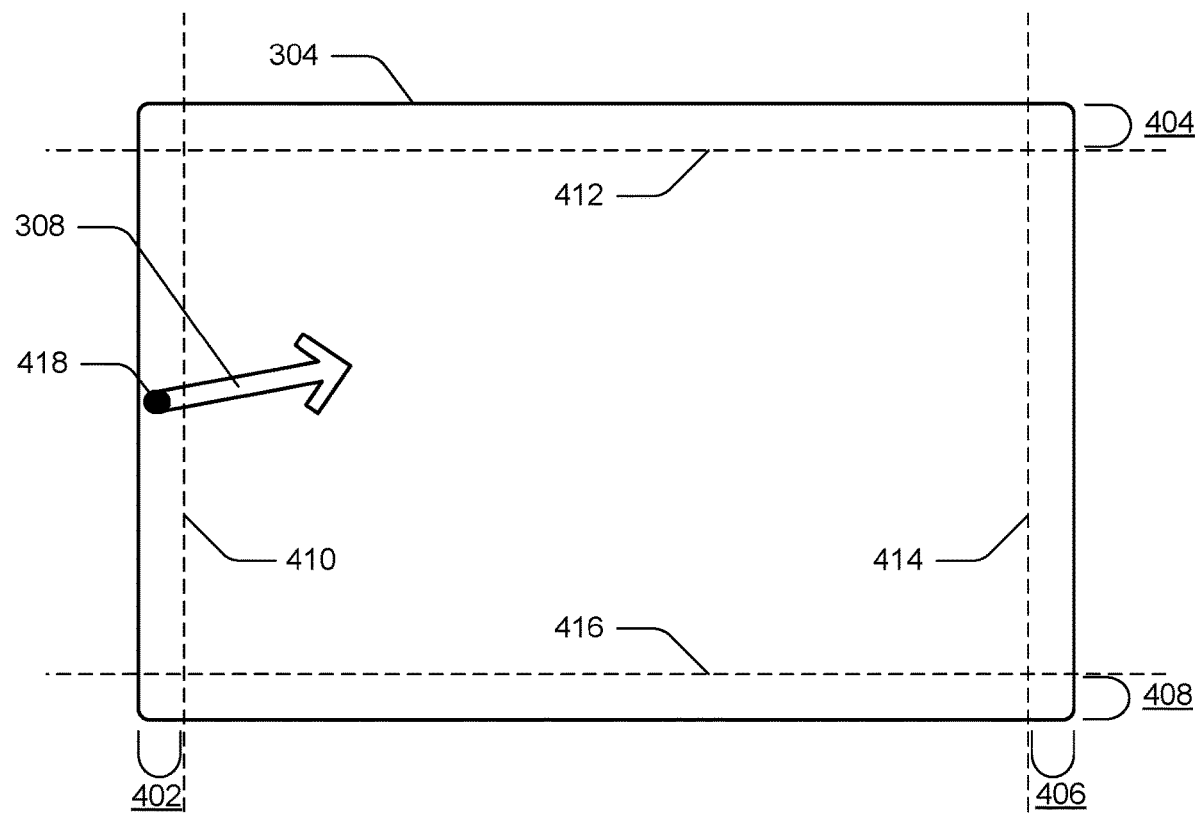
FIG. 4 illustrates the example immersive interface of FIG. 3 along with example edges.

Continuing the ongoing example, consider FIG. 4, which illustrates immersive interface 304 and gesture 308 of FIG. 3 as well as left edge 402, top edge 404, right edge 406, and bottom edge 408. For visual clarity webpage 306 is not shown. In this example the dimensions of the interface and display are of a moderate size, between that of smart phones and that of many laptop and desktop displays. Edges 402, 404, 406, and 408 have a small dimension of twenty pixels, an area of each shown bounded by dashed lines at twenty pixels from the display or interface limit at edge limit 410, 412, 414, and 416, respectively.

Gesture handler 128 determines that gesture 308 has a start point 418 and that this start point 418 is within left edge 402. Gesture handler 128 determines the start point in this case by receiving data indicating [X,Y] coordinates in pixels at which gesture 308 begins and comparing the first of these coordinates to those pixels contained within each edge 402-408. Gesture handler 128 often can determine the start point and whether it is in an edge faster than a sample rate, thereby causing little or no performance downgrade from techniques that simply pass gestures directly to an exposed interface over which a gesture is made.

Returning to method 200 generally, if block 204 determines that the start point of the gesture is not at an edge, method 200 proceeds along a "No" path to block 206. Block 206 passes the gestures to an exposed user interface, such as an underlying interface over which the gesture was received. Altering the ongoing example, assume that gesture 308 was determined not to have a start point within an edge. In such a case gesture handler 128 passes buffered data for gesture 308 to immersive user interface 304. After passing the gesture, method 200 ends.

If block 204 determines that the start point of the gesture is in an edge, method 200 proceeds along a "Yes" path to block 208. Block 208 responds to the positive determination of block 204 by determining whether a line from the start point to a later point of the gesture is approximately perpendicular from the edge.

Block 208, in some embodiments, determines the later point used. Gesture handler 128, for example, can determine the later point of the gesture based on the later point being received a preset distance from the edge or the start point, such as past edge limit 410 for edge 402 or twenty pixels from start point 418, all of FIG. 4. In some other embodiments, gesture handler 128 determines the later point based on it being received a preset time after receipt of the start point, such an amount of time slightly greater than used generally by computing device 102 to determine that a gesture is a tap-and-hold or hover gesture.

For the ongoing embodiment, gesture handler 128 uses a later-received point of gesture 308 received outside of edge 402 so long as that later-received point is received within a preset time. If no point is received outside of the edge within that preset time, gesture handler 128 proceeds to block 206 and passes gesture 308 to immersive interface 304.

Using the start point, block 208 determines whether a line from the start point to the later point of the gesture is approximately perpendicular to the edge. Various angles of variance can be used in this determination by block 208, such as five, ten, twenty, or thirty degrees.

Figure 5:
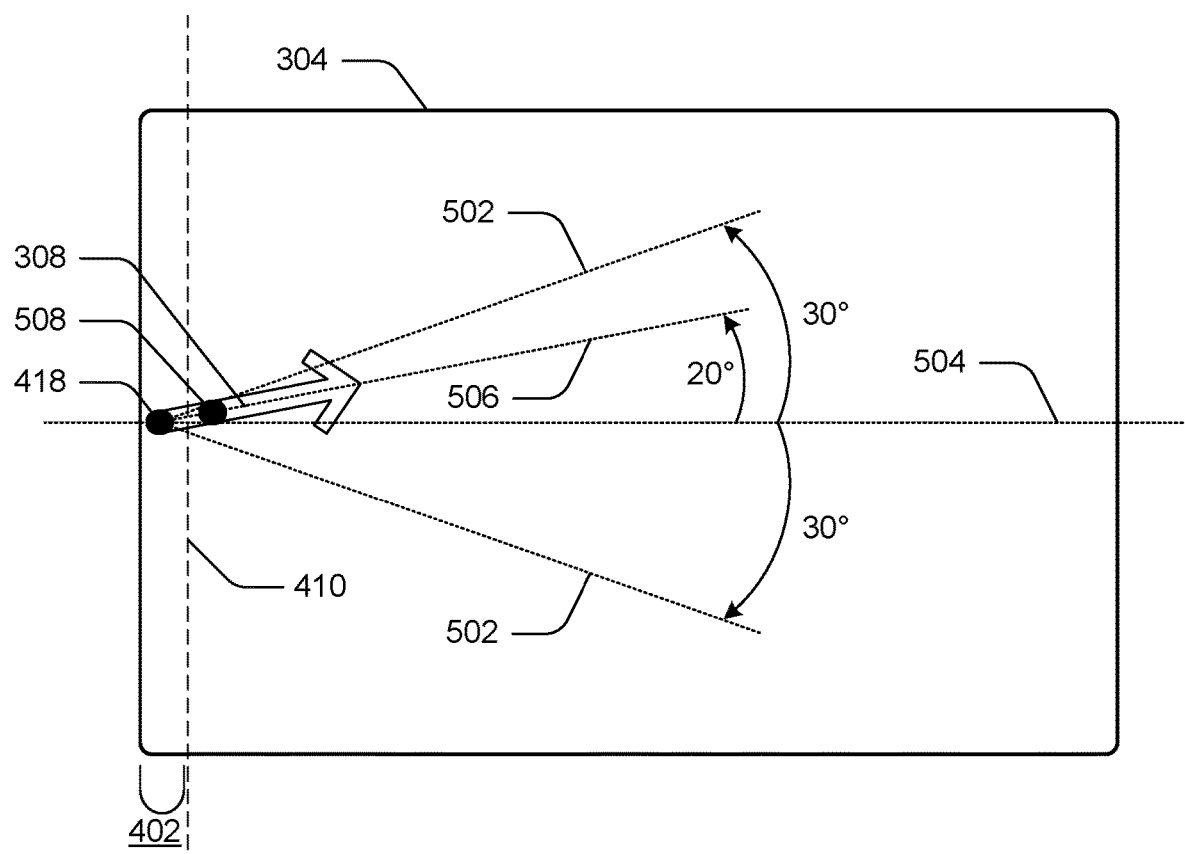
FIG. 5 illustrates the example immersive interface of FIGS. 3 and 4 along with angular variance lines from a perpendicular line and a line from a start point to a later point of a gesture.

By way of example, consider an angle of variance of thirty degrees from perpendicular. FIG. 5 illustrates this example variance, showing immersive interface 304, gesture 308, left edge 402, left edge limit 410, and start point 418 of FIGS. 3 and 4 along with a thirty-degree variance lines 502 from perpendicular line 504. Thus, gesture handler 128 determines that line 506 from start point 418 to later point 508 (which is at about twenty degrees from perpendicular) is approximately perpendicular based on being within the example thirty-degree variance line 502.

Generally, if block 208 determines that the line is not approximately perpendicular to the edge, method 200 proceeds along a "No" path to block 206. As noted in part above, block 208 may also determine that a later point or other aspect of a gesture disqualifies the gesture. Examples include when a later point is within the edge, such as due to a hover, tap, press-and-hold, or up-and-down gesture (e.g., to scroll content in the user interface), or when the gesture is set to be a single-input gesture and a second input is received (e.g., a first finger starts at an edge but a second finger then lands anywhere).

If block 208 determines that the line is approximately perpendicular based a later point outside the edge, method 200 proceeds along a "Yes" path to block 210.

Figure 6:
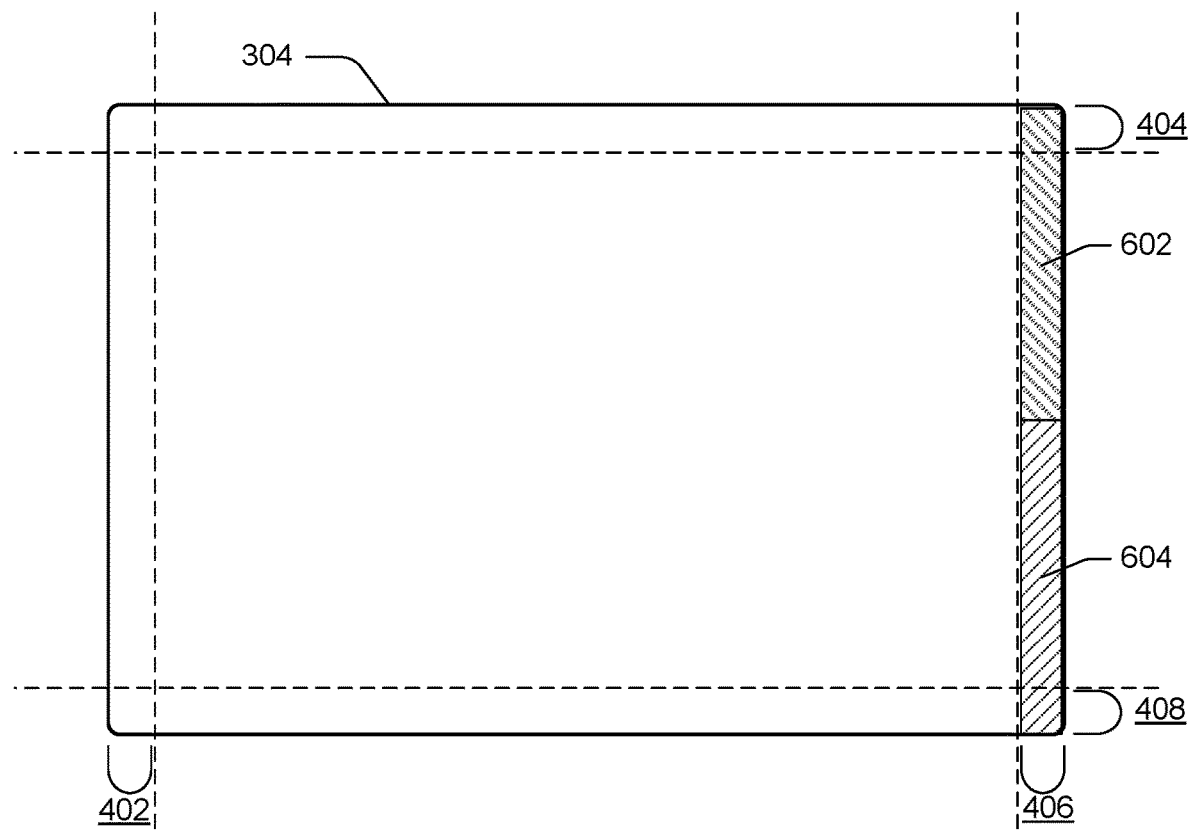
FIG. 6 illustrates the edges of the immersive interface shown in FIG. 4 along with two regions in the right edge.

Block 210 responds to the positive determination of block 208 by passing the gesture to an entity other than the exposed user interface. This entity is not a user interface over which the gesture was received, assuming it was received over a user interface at all. Block 210 may determine to which entity to pass the gesture as well, such as based on an edge or region of an edge in which the start point of the gesture is received. Consider FIG. 6, for example, which illustrates immersive interface 304 and edges 402, 404, 406, and 408 of FIG. 4 but adds top region 602 and bottom region 604 to right edge 406. A start point in top region 602 can result in a different entity (or even a same entity but a different user interface provided in response) than a start point received to bottom region 604. Likewise, a start point in top edge 404 can result in a different entity or interface than left edge 402 or bottom edge 408.

In some cases, this entity is an application associated with the user interface. In such a case, passing the gesture to the entity can be effective to cause the application to present a second user interface enabling interaction with the application. In the movie example above, the entity can be the media player playing the movie but not the immersive interface displaying the movie. The media player can then present a second user interface enabling selection of subtitles or a director's commentary rather than selections enabled by the interface displaying the movie, such as "pause," "play," and "stop." This capability is permitted in FIG. 1, where one of applications 136 can include or be capable of presenting more than one application user interface 138. Thus, block 210 can pass the gesture to system-interface module 126, the one of applications 136 currently presenting the user interface, or another of applications 136, to name just three possibilities.

Figure 7:
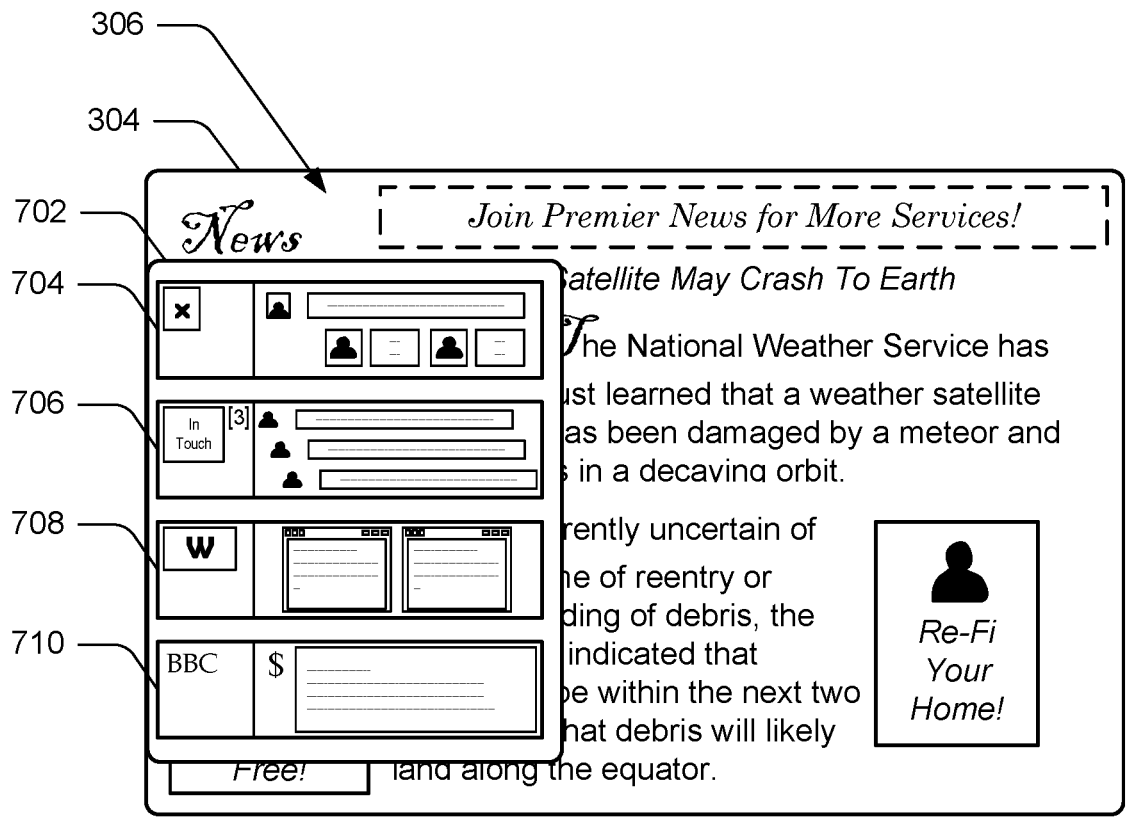
FIG. 7 illustrates an application-selection interface presented by a system-interface module in response to an edge gesture made over the immersive interface and webpage of FIG. 3.

Concluding the ongoing embodiment, at block 210 gesture handler 128 passes gesture 308 to system-interface module 126. System-interface module 126 receives the buffered portion of gesture 308 and continues to receive the rest of gesture 308 as it is made by the user. FIG. 7 illustrates a possible response upon receiving gesture 308, showing an application-selection interface 702 presented by system-interface module 126 and over immersive interface 304 and webpage 306 from FIG. 3. Application-selection interface 702 enables selection of various other applications and their respective interfaces at selectable application tiles 704, 706, 708, and 710.

The example application-selection interface 702 is an immersive user interface presented using immersive mode module 124, though this is not required. Presented interfaces may instead be windows-based and presented using windows-based module 122. Both of these modules are illustrated in FIG. 1.

Block 210 may also or instead determine to pass the gesture to different entities and/or interfaces based on other factors about the gesture received. Example factors are described in greater detail in method 800 below.

Note that method 200 and other methods described hereafter can be performed in real-time, such as while a gesture is being made and received. This permits, among other things, a user interface presented in response to a gesture to be presented prior to completion of the gesture. Further, the user interface can be presented progressively as the gesture is received. This permits a user experience of dragging out the user interface from the edge as the gesture is performed with the user interface appearing to "stick" to the gesture (e.g., to a mouse point or person's finger making the gesture).

Figure 8:
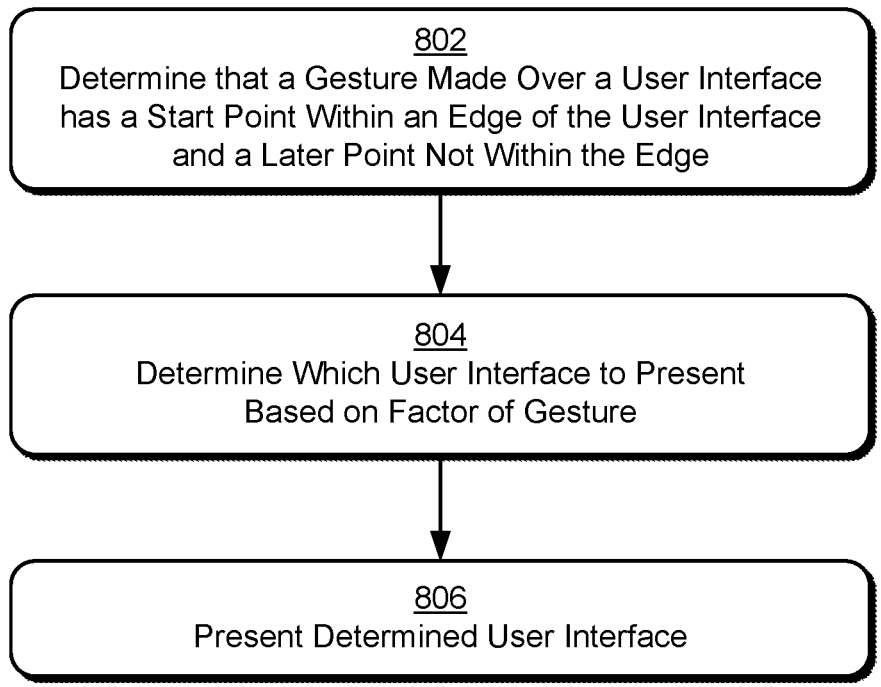
FIG. 8 illustrates an example method for enabling edge gestures including determining an interface to present based on some factor of the gesture.

FIG. 8 depicts a method 800 for enabling edge gestures including determining an interface to present based on some factor of the gesture. In portions of the following discussion reference may be made to system 100 of FIG. 1, reference to which is made for example only. Method 800 may act wholly or partly separate from or in conjunction with other methods described herein.

Block 802 determines that a gesture made over a user interface has a start point at an edge of the user interface and a later point not within the edge. Block 802 may operate similarly to or use aspects of method 200, such as determining a later point on which to base block 802's determination. Block 802 may act differently as well.

In one case, for example, block 802 determines that a gesture is a single-finger swipe gesture starting at an edge of an exposed immersive user interface and having a later point not at the edge but not based on an angle of the gesture. Based on this determination, block 802 proceeds to block 804 rather than pass the gesture to the exposed immersive user interface.

Block 804 determines which interface to present based on one or more factors of the gesture. Block 804 may do so based on a final or intermediate length of the gesture, whether the gesture is single or multi-point (e.g., a single-finger or multi-finger gesture), or a speed of the gesture. Thus, block 804 may determine to present a start menu in response to a multi-finger gesture, an application-selection interface in response to a relatively short single-finger gesture, or a system-control interface permitting selection to shut down computing device 102 in response to relatively long single-finger gesture, for example. To do so, gesture handler 128 may determine the length of the gesture or a number of inputs (e.g., fingers). In response, block 806 presents the determined user interface.

Assume, by way of example, that gesture handler 128 determines, based on a factor of the gesture, to present a user interface enabling interaction with operating system 120. In response system-interface module 126 presents this user interface. Presentation of the user interface can be similar to manners described in other methods, such as with a progressive display of application-selection user interface 702 of FIG. 7.

Figure 9:
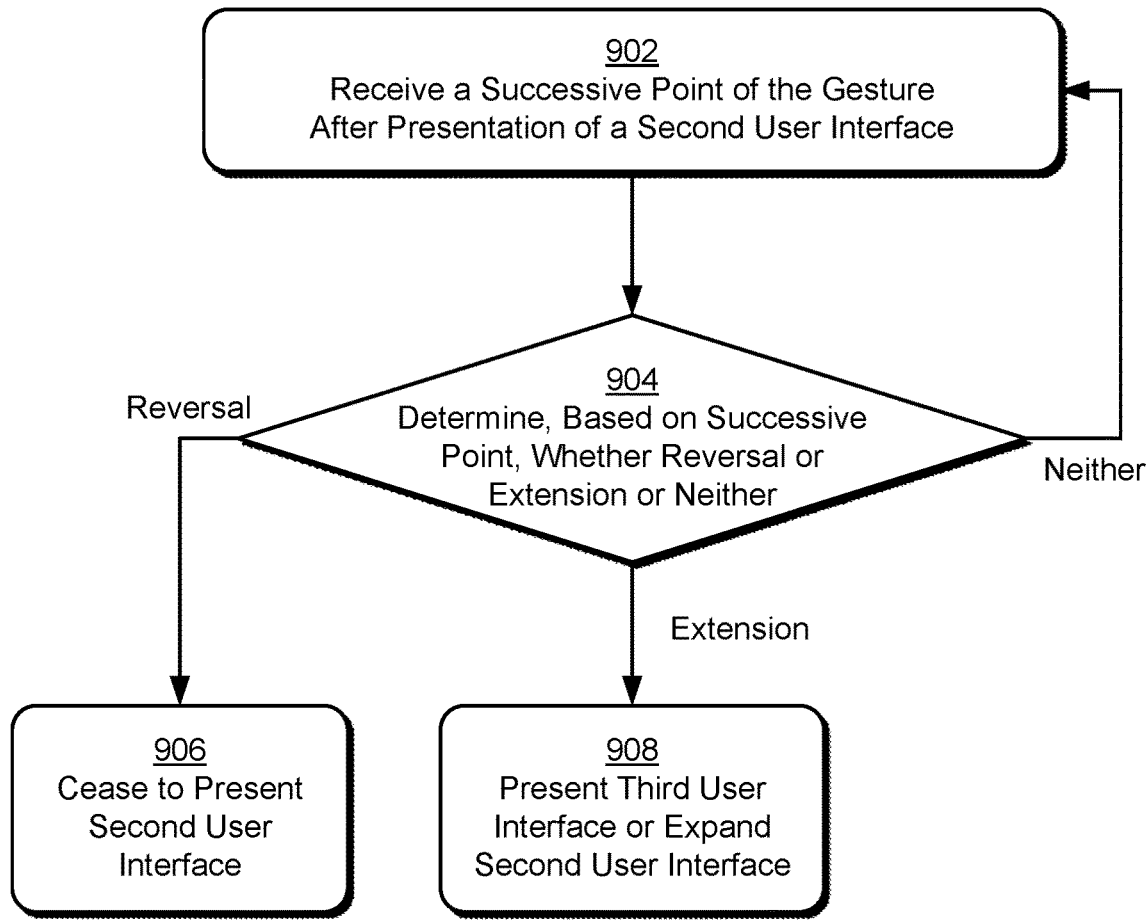
FIG. 9 illustrates an example method enabling expansion of, or ceasing presentation of, a user interface presented in response to an edge gesture or presentation of another user interface.

Following method 200 and/or method 800 in whole or in part, the techniques may proceed to perform method 900 of FIG. 9. Method 900 enables expansion of a user interface, presentation of another interface, or ceasing presentation of the user interface presented in response to an edge gesture.

Block 902 receives a successive point of the gesture and after presentation of at least some portion of the second user interface. As noted in part above, methods 200 and/or 800 are able to be presented or cause to be presented a second user interface, such as a second user interface for the same application associated with a current user interface, a different application, or a system user interface.

Figure 10:
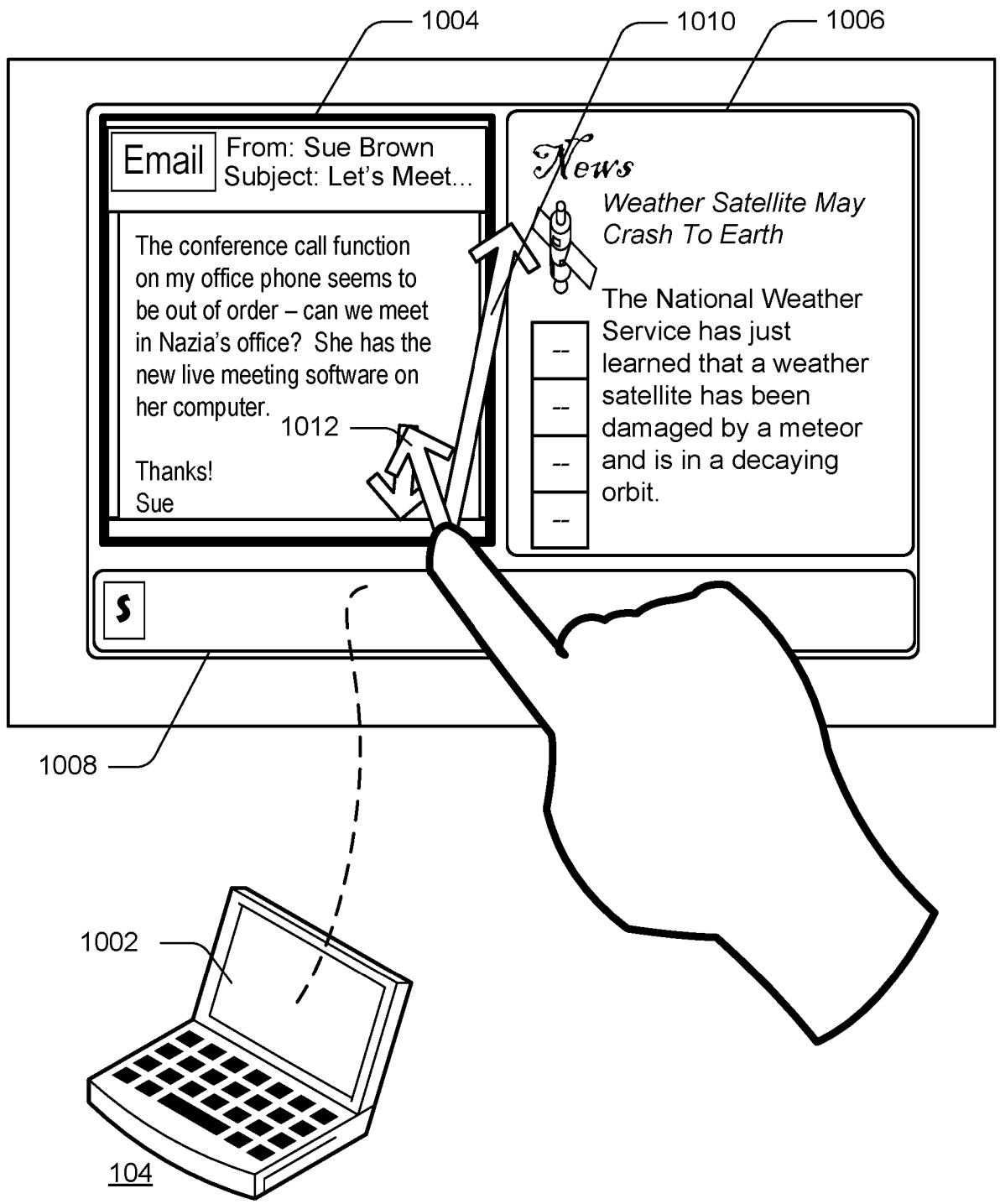
FIG. 10 illustrates a laptop computer having a touch-sensitive display having a windows-based email interface and two immersive interfaces.

By way of example, consider FIG. 10, which illustrates a laptop computer 104 having a touch-sensitive display 1002 displaying a windows-based email interface 1004 and two immersive interfaces 1006 and 1008. Windows-based email interface 1004 is associated with an application that manages email, which can be remote or local to laptop computer 104. FIG. 10 also illustrates two gestures, 1010 and 1012. Gesture 1010 proceeds in a straight line while gesture 1012 reverses back (shown with two arrows to show two directions).

Figure 11:
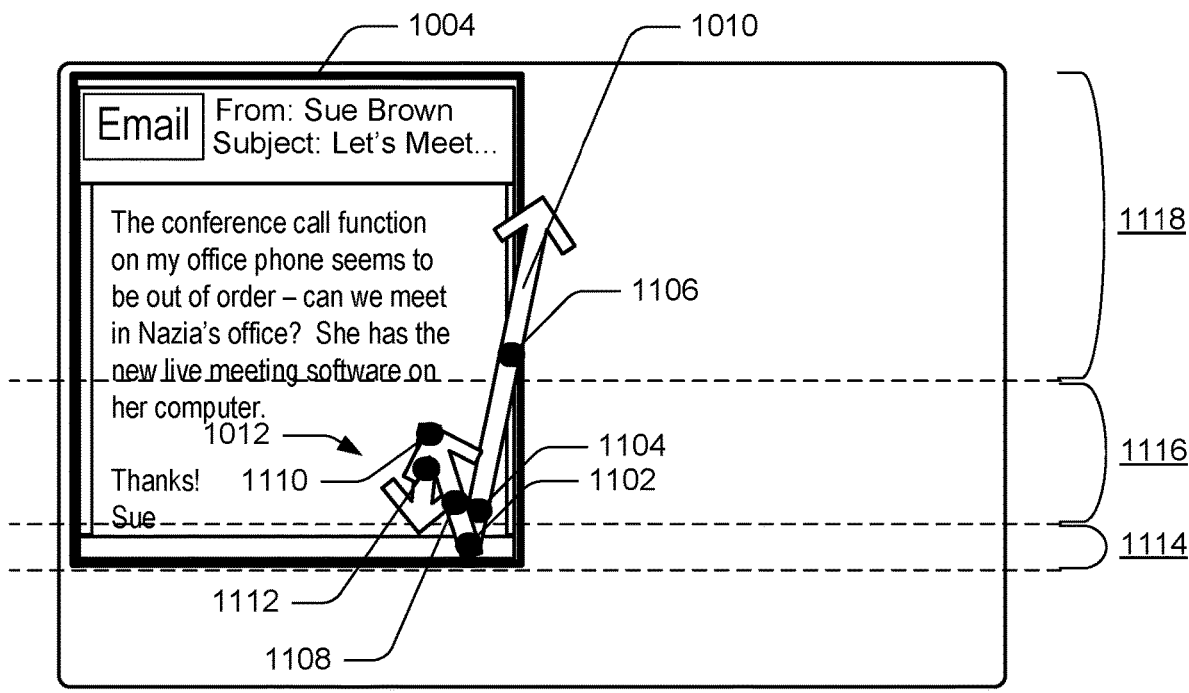
FIG. 11 illustrates the interfaces of FIG. 10 along with two gestures having a start point, later points, and one or more successive points.

FIG. 11 illustrates gesture 1010 having a start point 1102, a later point 1104, and a successive point 1106, and gesture 1012 having a same start point 1102, a later point 1108, and a first successive point 1110, and a second successive point 1112. FIG. 11 also shows a bottom edge 1114, a later-point area 1116, and an interface-addition area 1118.

Block 904 determines, based on the successive point, whether the gesture includes a reversal, an extension, or neither. Block 904 may determine a reversal by determining that a successive point is at the edge or is closer to the edge than a prior point of the gesture. Block 904 may determine that the gesture extends based on the successive point being a preset distance from the edge or the later point. If neither of these is determined to be true, method 900 may repeat blocks 902 and 904 to receive and analyze additional successive points until the gesture ends. If block 904 determines that there is a reversal, method 900 proceeds along "Reversal" path to block 906. If block 904 determines that the gesture is extended, method 900 proceeds along an "Extension" path to block 908.

In the context of the present example, assume that gesture handler 128 receives first successive point 1110 of gesture 1012. Gesture handler 128 then determines that first successive point 1110 is not at edge 1114, is not closer than a prior point of the gesture to edge 1114 (e.g., is not closer than later point 1108), and is not a preset distance from the edge or later point by not being within interface-addition region 1118. In such a case method 900 returns to block 902.

Figure 12:
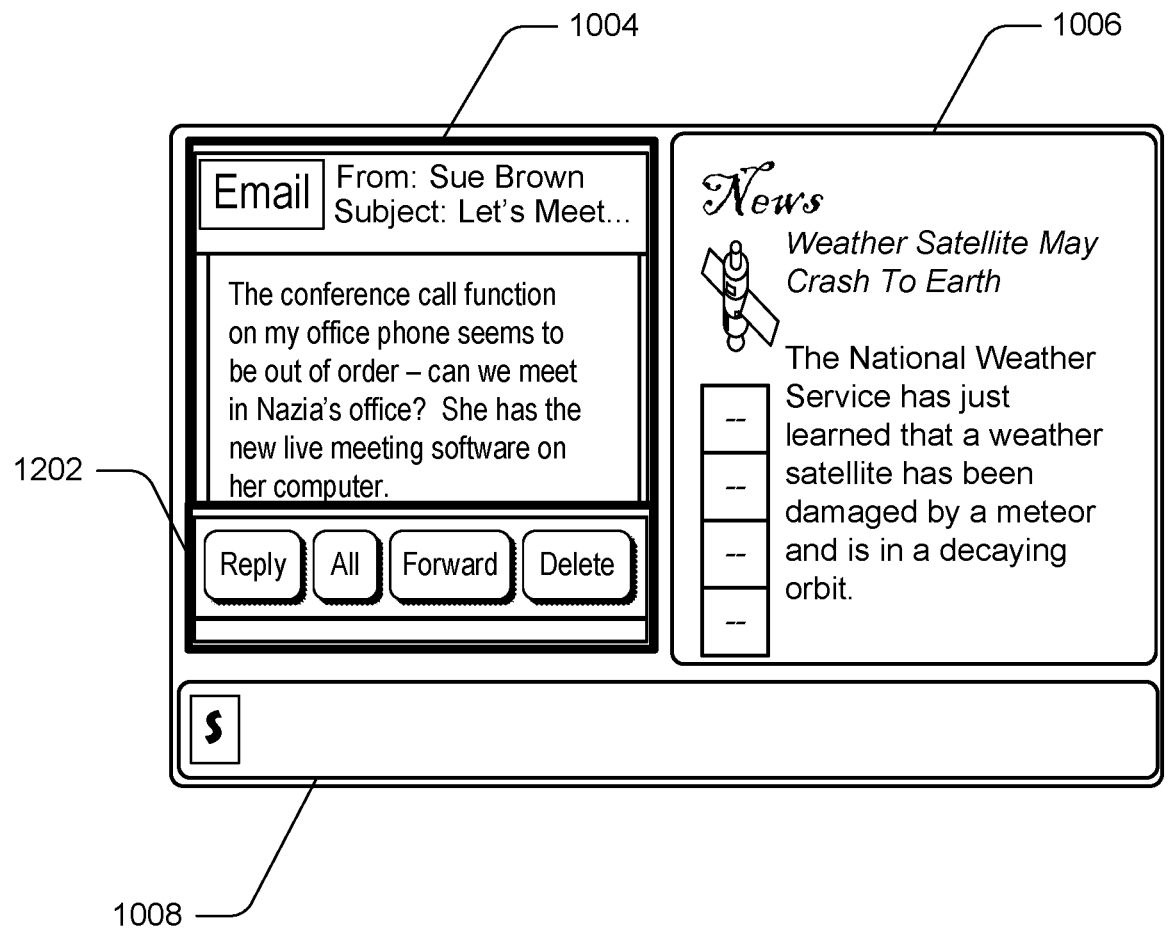
FIG. 12 illustrates the windows-based email interface of FIGS. 10 and 11 along with an email handling interface presented in response to an edge gesture.

On a second iteration of block 902, assume that gesture handler 128 receives second successive point 1112. In such a case, gesture handler 128 determines that second successive point 1112 is closer to edge 1114 than first successive point 1110 and thus gesture 1012 includes a reversal. Gesture handler 128 then proceeds to block 906 to cease to present the second user interface previously presented in response to the gesture. By way of example, consider FIG. 12, which illustrates an email handling interface 1202. In this example case of block 906, gesture handler 128 causes the email application to cease to present interface 1202 in response to a reversal of gesture 1012 (not shown removed).

Figure 13:
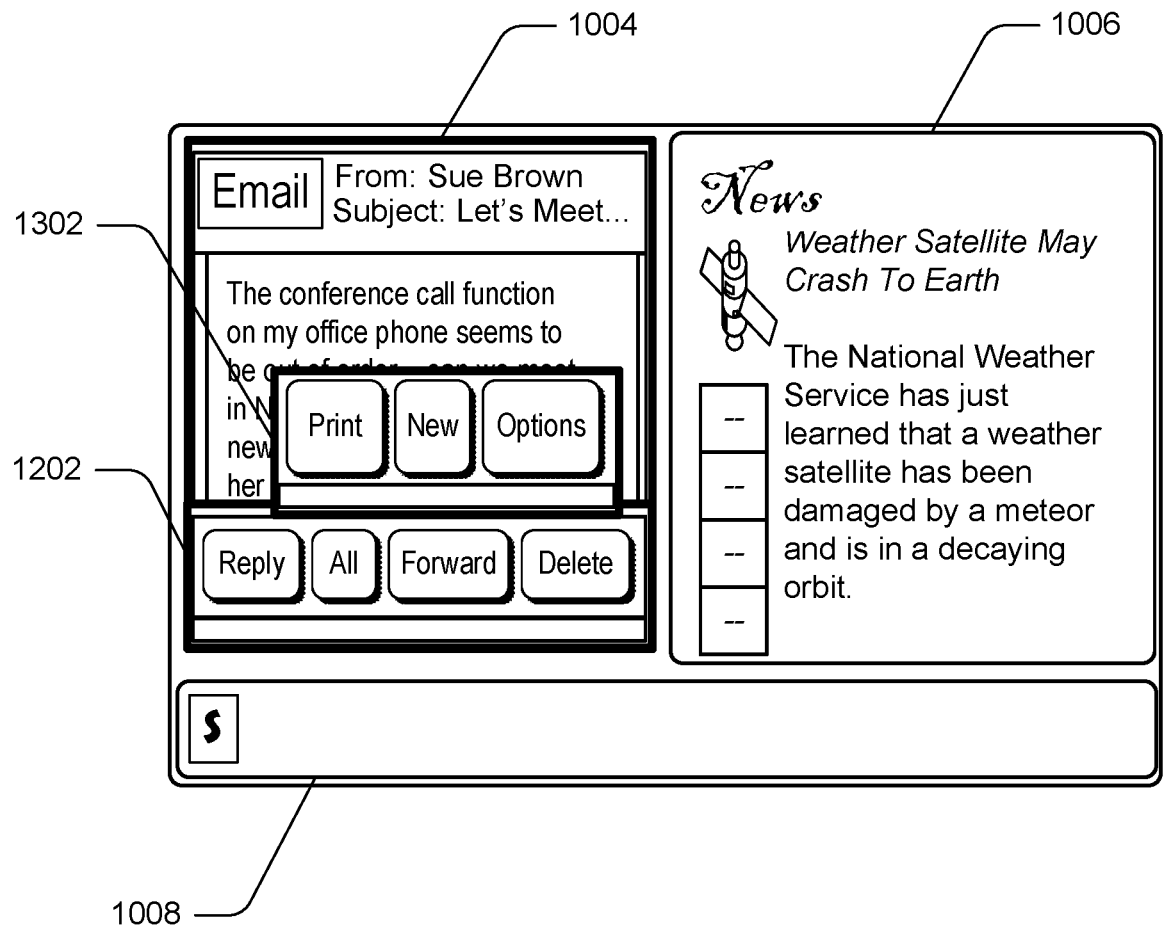
FIG. 13 illustrates the interfaces of FIG. 12 along with an additional-email-options interface presented in response to a gesture determined to have a successive point a preset distance from the edge.

Block 908, however, presents or causes presentation of a third user interface or expansion of the second user interface. Continuing the ongoing example, consider FIG. 13, which illustrates additional-email-options interface 1302 in response to gesture 1010 determined to have successive point 1106 a preset distance from edge 1104, in this case being within interface-addition region 1118 of FIG. 11. This region and preset distance can be set based on a size of the user interface previously presented in response to the gesture. Thus, a user wishing to add additional controls may simply extend the gesture past the user interface presented in response to an earlier portion of the gesture.

Method 900 can be repeated to add additional user interfaces or expand a presented user interface. Returning to the example interface 702 of FIG. 7, for example, gesture handler 128 can continue to add interfaces or controls to interface 702 as gesture 308 extends past interface 702, such as by presenting an additional set of selectable application tiles. If gesture 308 extends past the additional tiles, gesture handler 128 may cause system-interface module 124 to present another interface adjacent the tiles to enable the user to select controls, such as to suspend, hibernate, switch modes (immersive to windows-based and the reverse), or shut down computing device 102.

While the above example user interfaces presented in response to an edge gesture are opaque, they may also be partially transparent. This can be useful by not obscuring content. In the movie example described above, a user interface presented can be partially transparent thereby permitting the movie to be only partially obscured during use of the user interface. Similarly, in the example of FIGS. 12 and 13, interfaces 1202 and 1302 may be partially transparent, thereby enabling a user to see the text of the email while also selecting a control in one of the interfaces.

As noted above, example methods 200, 800, and 900 address edge gestures and are described prior to methods 1400 and 1700, which address switching back to a previously-interacted-with application. Any one or more of the method may be used separately or in combination with, in whole or in part, others of the methods.

Figure 14:
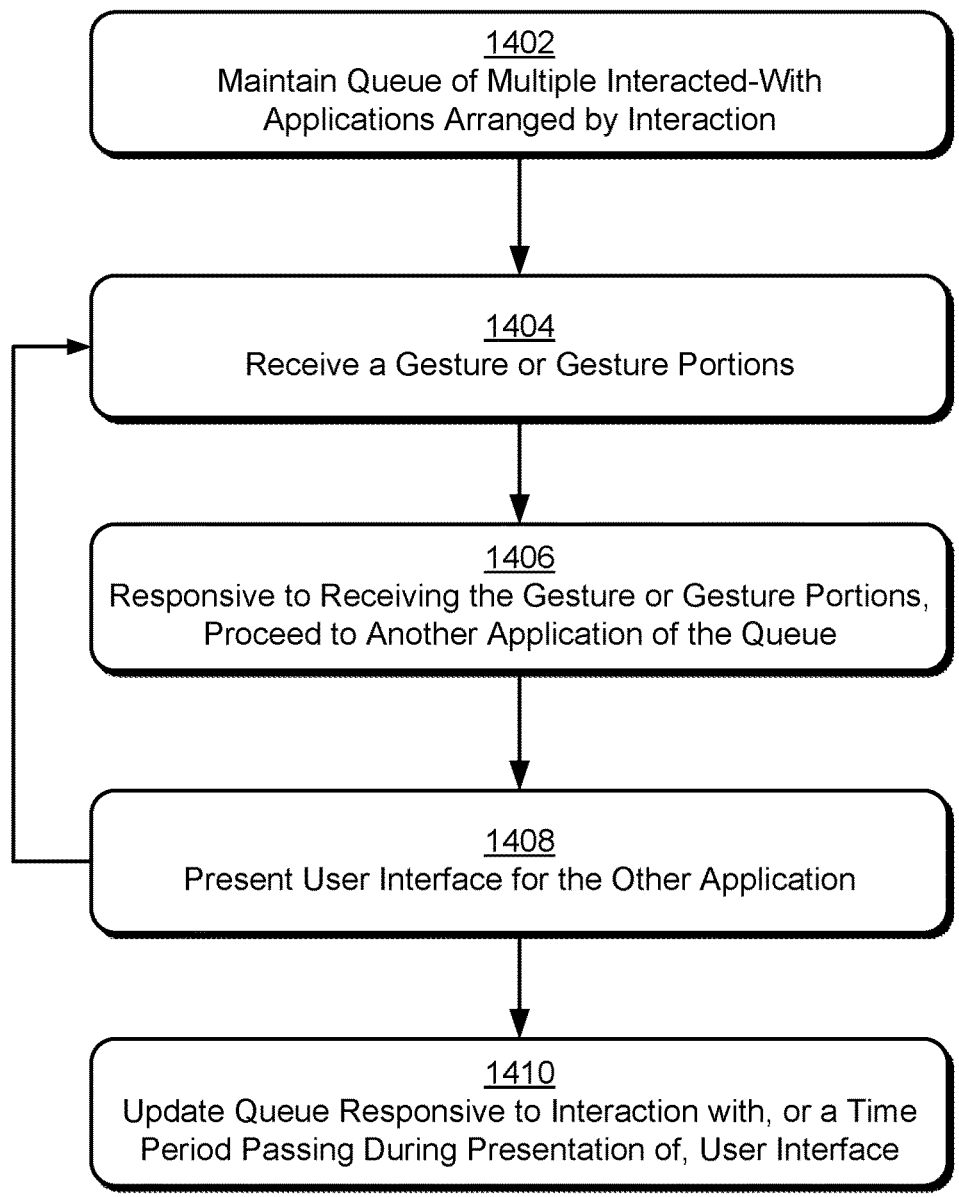
FIG. 14 illustrates a method for switching back to a previously-interacted-with application using a queue.

FIG. 14 depicts a method 1400 for switching back to a previously-interacted-with application using a queue. In portions of the following discussion reference may be made to system 100 of FIG. 1, methods 200, 800, and/or 900, and example embodiments described above, reference to which is made for example only.

Block 1402 maintains a queue of multiple interacted-with applications, the queue arranged by most-recently-interacted-with to least-recently-interacted-with applications other than a current application. Consider, for example, FIG. 15, which illustrates an interaction order 1502 in which a user interacts with various applications. First, the user interacts with a web-searching application 1504 through its interface. Second, the user interacts with a web-enabled media application 1506 through a web browser. Third, the user interacts with a local (non-web) photo application 1508 through its interface. Fourth, the user interacts with a social-networking application 1510 through the web browser. Fifth, the user returns to interacting with the web-enabled media application 1506. Sixth, the user interacts with a web-enabled news application 1512 again through the web browser.

For the first interaction no queue is maintained as no other applications have been interacted with prior to this first interaction. For the second through sixth interactions of interaction order 1502, consider queues 1514, 1516, 1518, 1520, and 1522, which correspond to each interaction in interaction order 1502 after the first interaction, respectively. Queues 1514 to 1522 are example iterations of application queue 132 maintained by application manager 130, both of FIG. 1.

Figure 15:
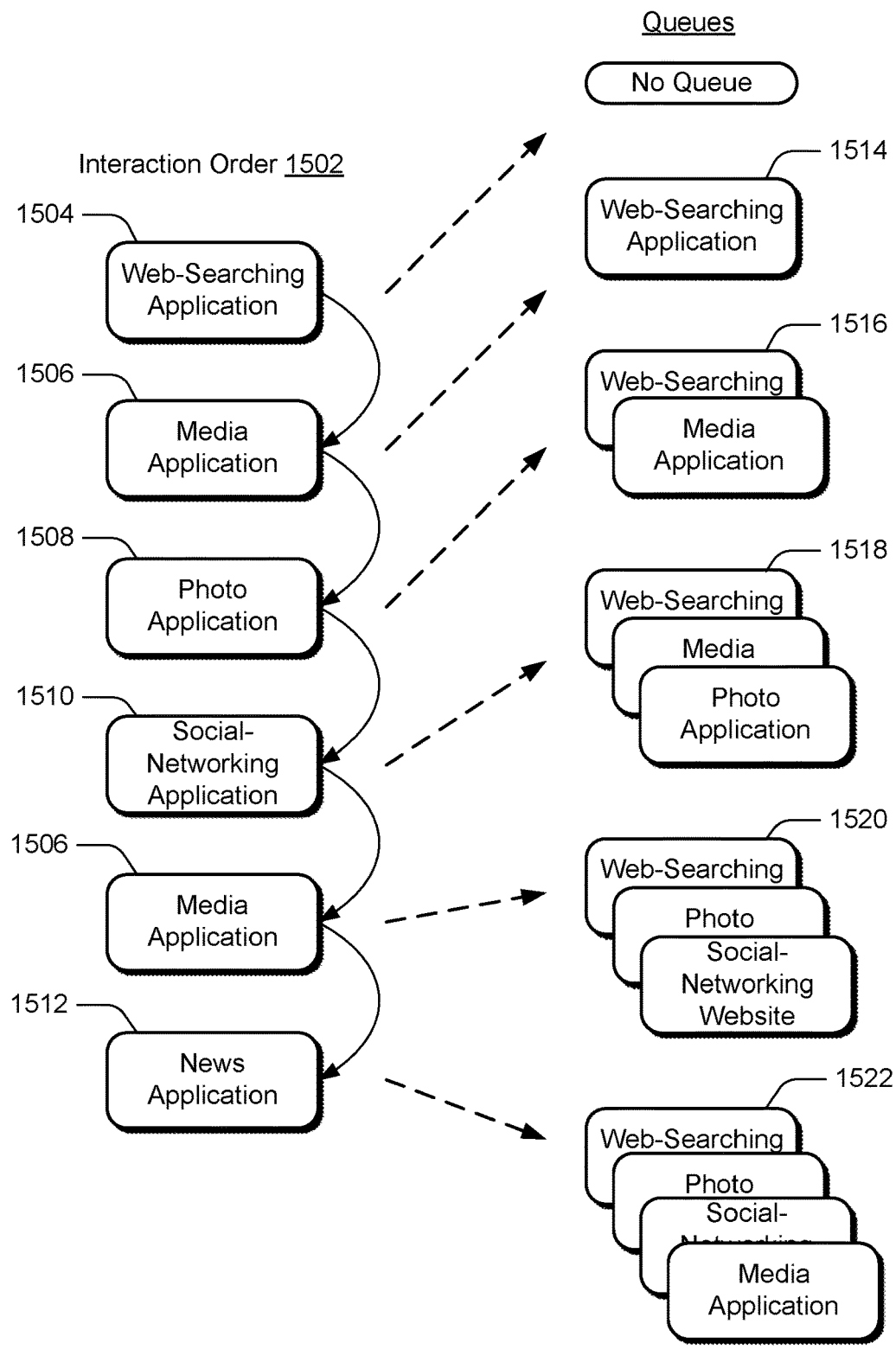
FIG. 15 illustrates an example interaction order in which a user interacts with various applications.

As shown in FIG. 15, application manager 130 keeps application queue 132 up-do-date based on a user's interactions. Queue 1522, for example, includes media application 1506 as the most-recently-interacted application, followed by social-networking application 1510, photo application 1508, and ending with web-searching application 1504. As the user interacts with media application 1506 twice (at the second and fifth interaction) application manager 130 removes it from application queue 130 at the fifth interaction and reorders the other applications to reflect an up-to-date order of interactions but excluding currently-interacted-with applications.

Block 1404 receives a gesture or gesture portions. This gesture or gesture portions can include one or more of the various gestures or portions described elsewhere herein, such as a pointer tracking a movement received through a touch pad, mouse, or roller ball or a physical movement made with arm(s), finger(s), or a stylus received through a motion-sensitive or touch-sensitive mechanism. In some embodiments, gesture portions are received, each portion being part of one gesture and each resulting in presentation of an application in the queue. Each of these portions may have, but are not required to have, a start point at an edge of a display, a later point not at the edge of the display, and a successive point at the edge of the display. A gesture having multiple portions in this case would look something like a multi-loop spiral, multiple circles, or a back-and-forth (e.g., zigzag) where each loop, circle, or back-and-forth starts, leaves, and returns to an edge of a user interface or display. Optionally, block 1404 may receive a number of gestures or gesture portions. These gestures or gesture portions can include one or more of the various gestures or gestures portions described elsewhere herein.

Continuing the ongoing embodiment, consider again FIG. 3, which illustrates tablet computing device 106 having touch-sensitive display 302 shown displaying immersive interface 304 including webpage 306. For this example, assume that immersive interface 304 is associated with news application 1512 and that webpage 306 is content from news application 1512.

As part of this example, at block 1404, gesture handler 128 receives gesture 308 as shown in FIG. 3, which gesture handler 128 passes to application manager 130. For the ongoing example, assume that gesture 308 is determined to be associated with switching back to a previously-interacted-with application rather than some other function or application.

Block 1406, responsive to receiving the gesture or gesture portions, proceeds through the queue to another application of the multiple interacted-with applications. Thus, on receiving the gesture or gesture portion(s), application manager 130 may proceed to the first, and thus the most-recently-interacted-with of the applications of application queue 132. In some embodiments, on receiving two gestures or portions, application manager 130 may proceed to the second most-recently-interacted-with application of application queue 132, though method 1400 may do so by repeating blocks 1404, 1406 and/or 1408, and so forth as described below.

Continuing the ongoing embodiment, assume that gesture 308 is received after the sixth interaction at which time the currently-interacted-with application is news application 1512 and that application queue 132 is up-to-date and represented by queue 1522 of FIG. 15. In such a case, application manager 130 proceeds to media application 1506 on receiving the gesture or gesture portion.

Block 1408 presents a user interface associated with the other application. This user interface, in some embodiments, is the same user interface through which interaction with the application was previously made. In some embodiments, the user interface is presented as a thumbnail or transparent overlay above the currently presented user interface. Application manager 130 presents this user interface alone or in combination with the associated application, such as by causing the associated application to present the user interface with which the user last interacted.

For this example, application manager 130 presents a thumbnail image of the user interface for the application progressively as gesture 308 is received and then expands the thumbnail to encompass the available real estate of the display when the gesture ends. Application manager 130 thereby replaces webpage 306 in immersive interface 304 or replaces immersive interface 304 with another interface, which can be immersive or windows-based.

Figure 16:
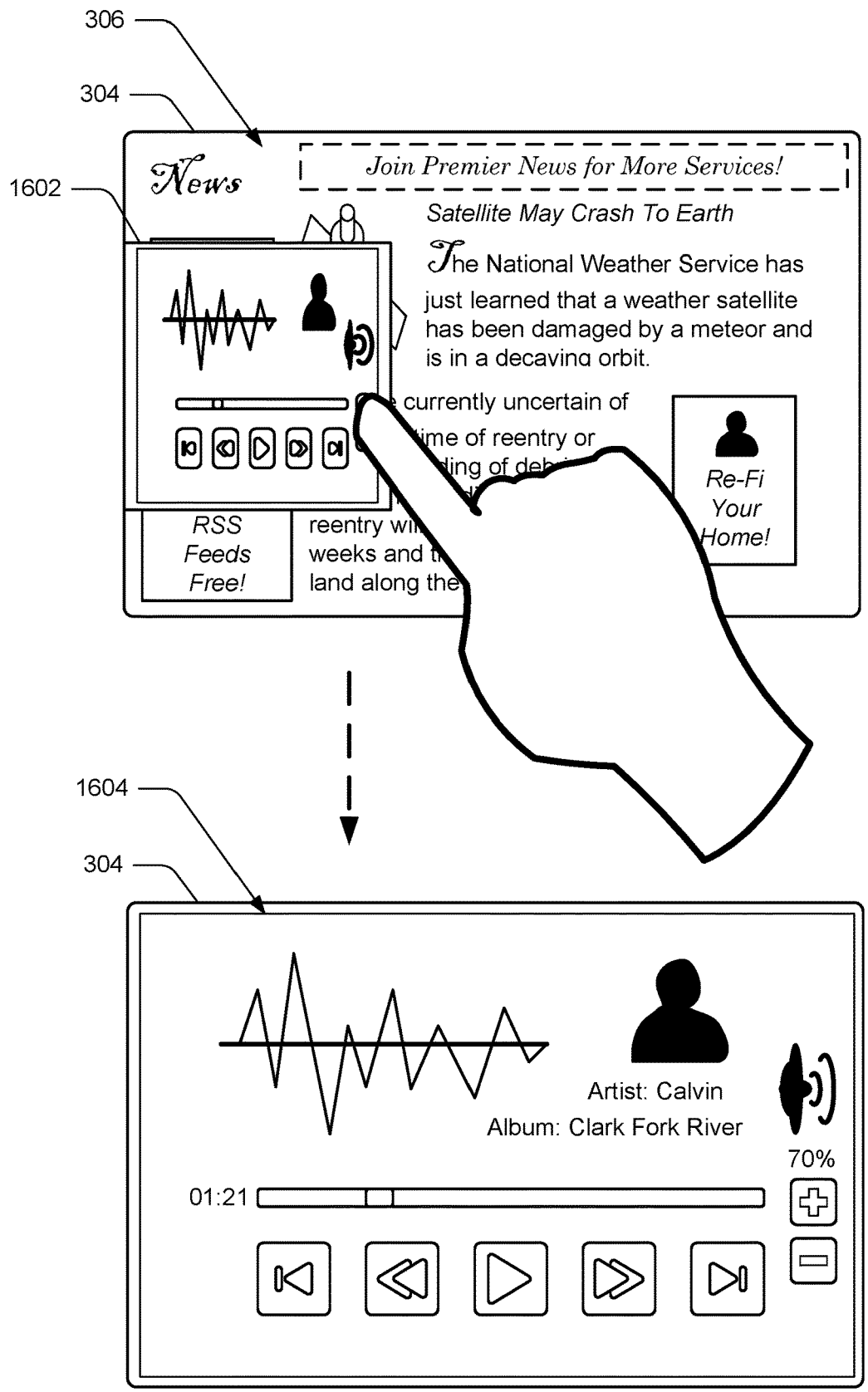
FIG. 16 illustrates the immersive interface of FIG. 3 along with a thumbnail image of a user interface of a prior application.

This is illustrated in FIG. 16 with thumbnail image 1602 of a user interface of media application 1506 presented over immersive interface 304 and webpage 306 of news application 1510. After gesture 308 ends, thumbnail image 1602 expands into full image 1604, replacing webpage 306 in immersive interface 304. Note that application manager 130 may keep the thumbnail image of the user interface "live." In effect, the thumbnail image may simply be a smaller version of the user interface; a video clip playing on the user interface may still be playing on the thumbnail image of the user interface, and even during movement of that thumbnail image.

This is but one example manner for presenting the user interface for the selected application, others manners for responding progressively or otherwise are described elsewhere herein.

In some embodiments, block 1408 shrinks the current user interface to a second thumbnail image and passes the second thumbnail image toward a region of a display from which the first-mentioned thumbnail image is progressively presented. Thus, block 1408 expands thumbnail image 1602 into full image 1604 while shrinking webpage 306 to a thumbnail image and passing that thumbnail to the edge from which thumbnail image 1602 was selected.

During the presentation of the user interface at block 1408, another gesture or gesture portion may be received, returning to block 1404. In some cases, the other gesture or gesture portion is received within an amount of time while the user interface is presented by block 1408. Following the return to block 1404, block 1406 may then proceed to yet another or subsequent application of the multiple interacted-with applications. Continuing this progression, block 1408 then presents a user interface associated with the subsequent application of the multiple interacted-with applications.

Thus, by repeating blocks 1404, 1406, and 1408 user interfaces associated with previously interacted-with applications can be successively presented. In some cases, a user interface associated with a previously-interacted with application can be presented responsive to each gesture received. In the context of the present example, when another gesture is received while presenting the user interface of media application 1506, a user interface associated with social-networking application 1510 (the second most-recently interacted with application of queue 1522) is presented. Receiving yet another gesture or gesture portion during the presentation of the user interface associated with social-networking application 1510 results in a presentation of a user interface associated with photo application 1508 (the third most-recently interacted with application of queue 1522) and so forth.

Following this switch from presenting a current application to a presenting another selected, prior application, block 1410 updates the queue responsive to interaction with, or a time period passing during presentation of, the user interface associated with the other application. In some cases a prior application may be selected and then another quickly selected after it, effectively a scanning through of the applications in the queue. In such cases, block 1410 may forgo updating the queue, as a quick viewing may not be considered an interaction.

Example interactions with which application manager 130 updates application queue 132 include an explicit selection to interact with the newly presented interface, such as to control playback or edit information relating to currently playing media using controls shown in the user interface of media player 1604 of FIG. 16. In other cases an interaction is determined based on a time period passing. Assume, for example, that the news application's webpage is presented on selection rather than being the current application. After some period, such as one, two, or three seconds, for example, application manager 130 determines that the delay is effectively an interaction based on a likelihood that the user is reading the news article in the webpage. Similarly, presentation of a user interface for a media application at block 1408 that is playing media and remains on the display without another selection of applications in application queue 132 can also be considered an interaction.

As noted in part above, application queue 132 can be circular. In so doing, selection of applications is not stopped but rather rolls if a user reaches a least-recently-interacted with application of application queue 132. For example, on selecting to switch back to a prior application from social-networking application 1510 and thus using queue 1518, switching back once results in selecting photo application 1508, twice results in media application 1506, and three times to web-searching application 1504. A fourth selection to switch back returns, in a circular fashion, to again result in presenting photo application 1508.

Method 1400 describes various ways in which the techniques can enable selection of previously-interacted-with applications and determine which to present based on a queue. Method 1700 may operate in conjunction with method 1400 and other methods described herein, though using a queue is not required. Therefore, method 1400 is not intended to limit the techniques as described in example method 1700.

Figure 17:
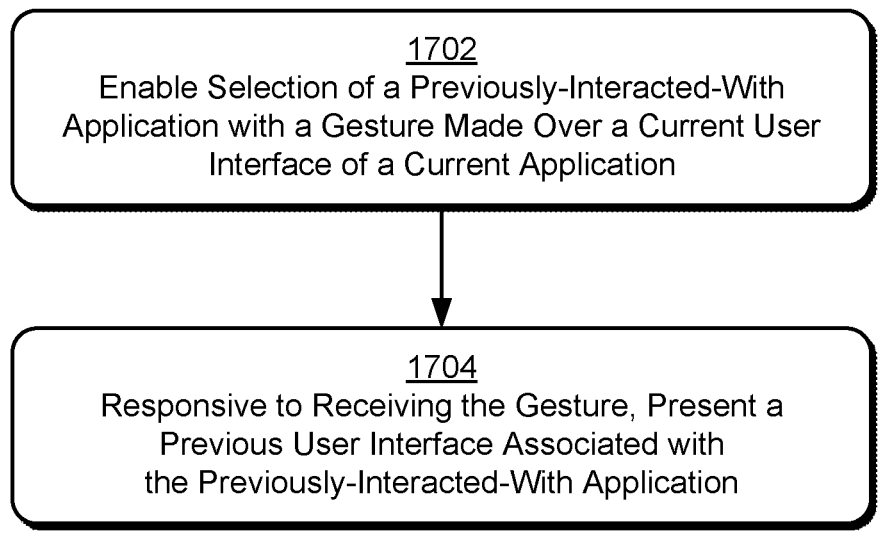
FIG. 17 illustrates a method for switching back to a previously-interacted-with application, which may or may not use a queue.

FIG. 17 depicts a method 1700 for switching back to a previously-interacted-with application, which may or may not use a queue. In portions of the following discussion reference may be made to system 100 of FIG. 1, methods 200, 800, 900, 1400, and example embodiments described above, reference to which is made for example only.

Block 1702 enables selection of a previously-interacted-with application through a gesture made over a current user interface associated with a current application. Block 1702 may do so in various manners described above, such as with an edge gesture or portion thereof, as but one example.

Block 1704, responsive to receiving the gesture and without further selection, presents a previous user interface associated with the previously-interacted-with application.

Assume, for example, that a portion of a gesture is received associated with selection of a prior application, such as an edge gesture starting at an edge of the current user interface and proceeding approximately perpendicularly away from the edge. In response, block 1704 presents the user interface for the previously-interacted-with application or a thumbnail image of the interface, or some indicator that selection has successfully been made along with an indicator of the application or the interface selected.

Example thumbnail images or indicators include any of selectable application tiles 704, 706, 708, and 710 of FIG. 7 some of which include a thumbnail image of an interface while others indicate the application selected. Another example is thumbnail image 1602 of FIG. 16.

Block 1704 presents the user interface of the selected, previously-interacted-with application, as shown in FIG. 16 at full image 1604. In so doing, block 1704 may enable interaction with photo application 1508 through immersive interface 304 without further selection. Thus, a user after selecting, with as little as one gesture, a prior application may interact without needing to make another selection. The user need not select to exit an application-selection mode, for example, or make the presented interface "live" or primary or on top of the stack. Simply put, the techniques enable selection of a prior application and further interaction with that prior application with a single input.

In this example of FIG. 16, immediately after full image 1604 is presented and replaces webpage 306, a next input to immersive interface 304 is passed immediately to photo application 1508. Thus, a tap, hot key, or other input is passed directly to photo application 1508, thereby enabling an immediate response by photo application 1508 to the input.

In some embodiments, the gesture made over the current user interface includes portions, each of which indicates a selection of a prior application. In such a case, block 1704 presents the previous user interface in response to the first portion and then, responsive to block 1702 receiving the second portion of the gesture, presents a further-previous user interface associated with a further previously-interacted-with application, and so forth.

Figure 18:
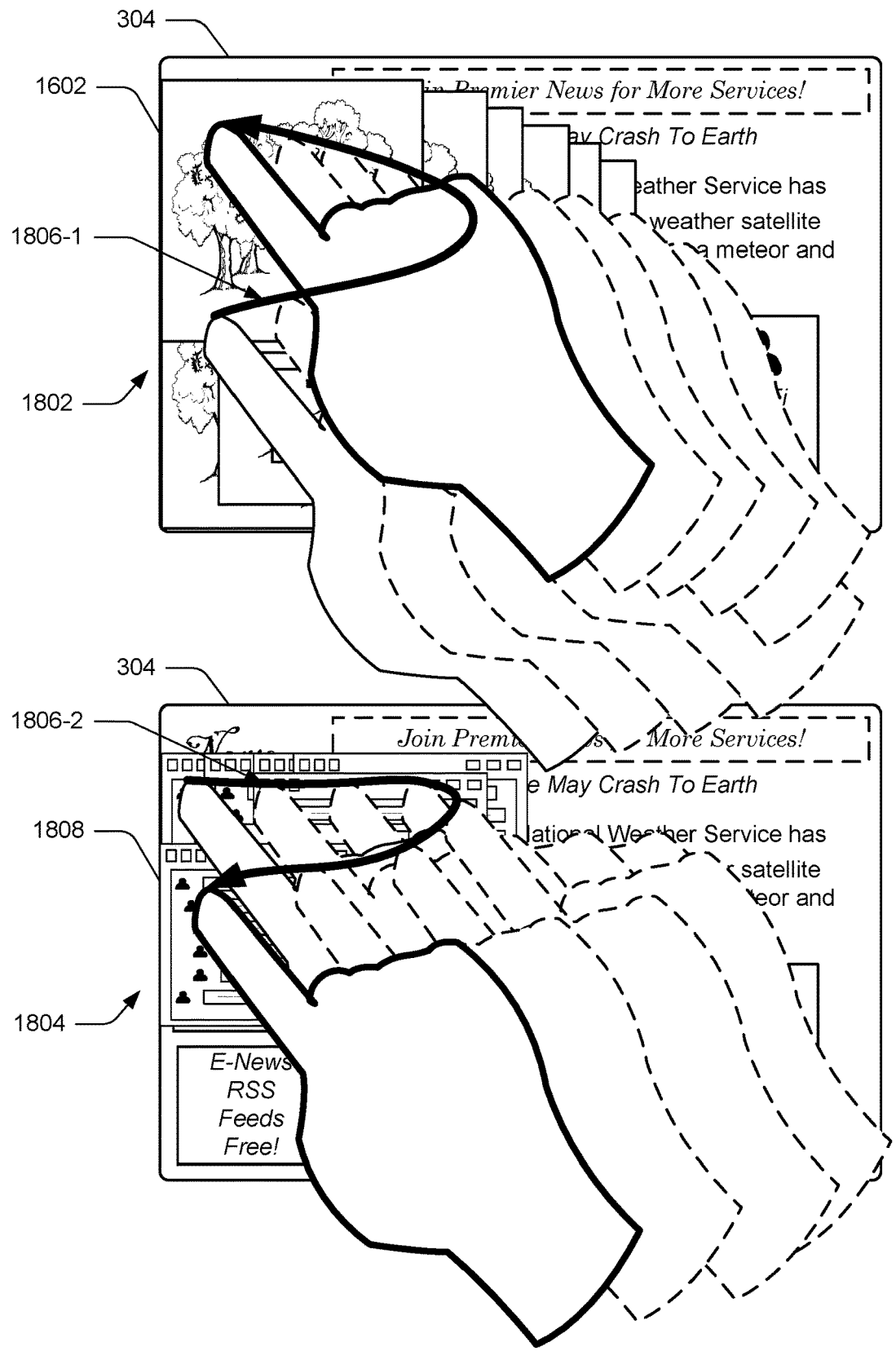
FIG. 18 illustrates the immersive interface of FIGS. 3 and 16, two progressive presentations, and two gesture portions.

This is illustrated in FIG. 18, which presents immersive interface 304 of FIG. 16 (shown twice for visual clarity), and ways in which block 1704 can respond to multiple gestures or portions of a single gesture. FIG. 18 illustrates two progressive presentations, 1802 and 1804, and gesture 1806 having two gesture portions 1806-1 and 1806-2, respectively. First progressive presentation 1802 illustrates a drag from a left edge of immersive interface 304 of thumbnail image 1602, and thus selection of the previously-interacted-with photo application 1508. Note that thumbnail image 1602 "sticks" to gesture portion 1806-1. Note also that gesture 1806, unlike gesture 308 of FIGS. 3 and 16, returns to the left edge. In response, rather than gesture 308 ending and full image 1604 replacing webpage 306, gesture portion 1806-1 of gesture 1806 returns to the edge at which it began. In this case thumbnail image 1602 is progressively displayed with gesture portion 1806-1 but then disappears when gesture portion 1806-1 returns to the edge.

Gesture 1806 continues with second portion 1806-2. In response, block 1704 presents second progressive presentation 1804, illustrating a second drag from the left edge of immersive interface 304. Here a social network thumbnail image 1808 of a further prior application, social-networking application 1510, is progressively presented. Gesture 1806 returns to the left edge as part of second portion 1806-2. In response, block 1704 drops off thumbnail image 1808 when gesture portion 1806-2 returns to the edge. This is but one example of ways in which the techniques enable users to select and view prior applications, even all of the previously-interacted-with applications, with only a single gesture. At any point in this example, gesture 1806 may end or indicate selection to present the full user interface for the selected application, at which time block 1704 presents the user interface (e.g., full image 1604 of FIG. 16 or a full user interface for the social-networking application).

As noted above, example methods 200, 800, and 900 address edge gestures and are described prior to methods 1400 and 1700, which address switching back to a previously-interacted-with application, which are in turn described prior to methods 1900 and 2200. Any one or more of the method may be used separately or in combination with, in whole or in part, others of the methods.

FIG. 19 depicts a method 1900 for managing an immersive interface in a multi-application immersive environment, including altering sizes of multiple immersive interfaces responsive to a single selection. In portions of the following discussion reference may be made to system 100 of FIG. 1, methods 200, 800, 900, 1400, and 1700, and example embodiments described above, reference to which is made for example only.

Block 1902 enables selection to alter a first size of a first immersive interface of a first application displayed in a multi-application immersive environment in which a second immersive interface of a second application is displayed at a second size.

Block 1902 can enable this selection in various manners set forth above, such as with a gesture, whether made through a gesture-sensitive display or a track pad or mouse, or with a hardware button or hot keys, to name just a few.

Figure 20:
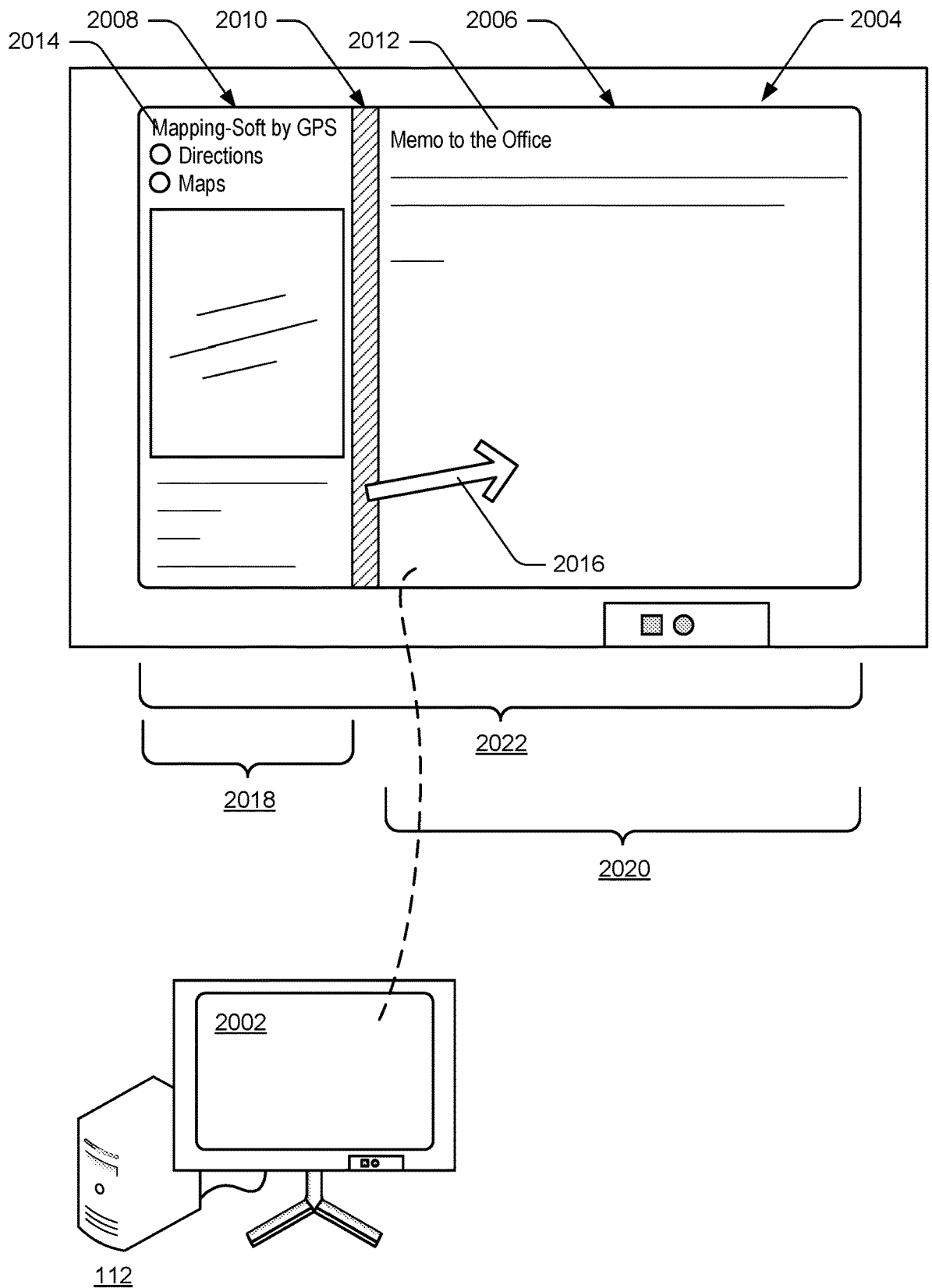
FIG. 20 illustrates the desktop computing device of FIG. 1 having a touch-sensitive display shown displaying a multi-application immersive environment with two immersive interfaces divided by an interface divider region.

Consider, by way of example, a case where block 1902 enables a select-and-move gesture selection through a gesture-sensitive display, the select-and-move gesture of an interface divider region between immersive interfaces of a multi-application immersive environment. This example is illustrated in FIG. 20, which illustrates a desktop computing device 112 having a touch-sensitive display 2002 shown displaying a multi-application immersive environment 2004. Multi-application immersive environment 2004 includes a larger immersive interface 2006 and a smaller immersive interface 2008 separated by an immersive interface divider 2010. Larger immersive interface 2006 is associated with a word-processing application and presents document content 2012. Smaller immersive interface 2008 is associated with a software mapping application and presents mapping content 2014. As part of an ongoing example, at block 1902 immersive manager 134 receives gesture 2016 as shown in FIG. 20, shown with an arrow but omitting an input actor (e.g., a finger or stylus).

Block 1904, responsive to selection to alter the first size of the first immersive interface, alters the first size of the first immersive interface and the second size of the second immersive interface. Block 1904, therefore, may alter sizes of multiple immersive interfaces responsive to as few as one selection. Further, block 1904 may do so concurrently and without occluding either of the interfaces. Further, in some embodiments, block 1904 notifies the application associated with the immersive interface about the change in size, thereby enabling the application to reflow the content.

Figure 21:
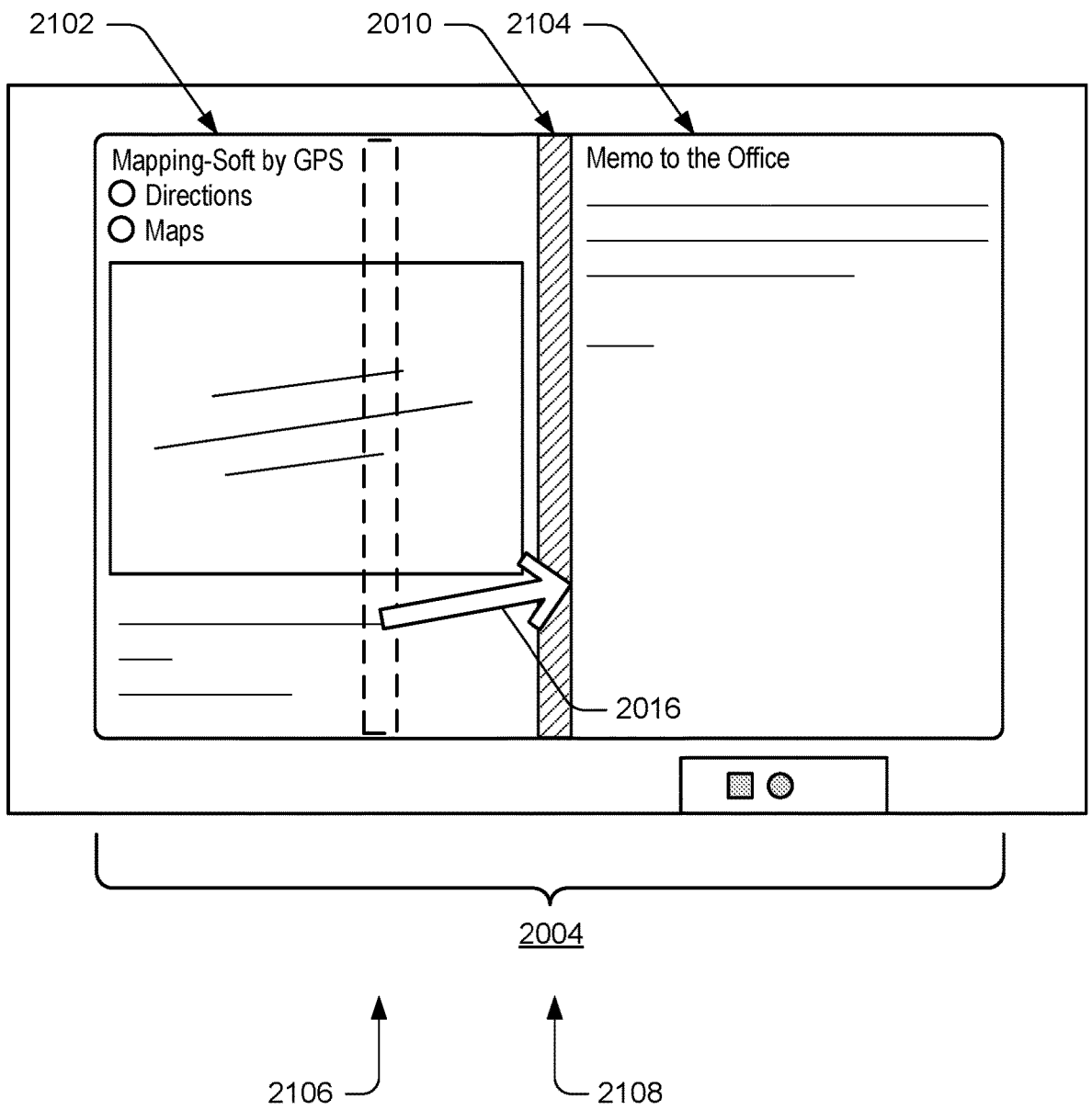
FIG. 21 illustrates the multi-application immersive environment of FIG. 20 with sizes of the two immersive interfaces altered and the interface divider region moved.

By way of example, consider the ongoing example of FIG. 20. Responsive to select-and-move gesture 2016 of interface divider region 2010, immersive manager 134 reduces one interface and increases the other concurrently, here increasing smaller immersive interface 2008 and decreasing, at the same time, larger immersive interface 2006. The result of this alteration is illustrated in FIG. 21 at altered smaller immersive interface 2102 and altered larger immersive interface 2104. The prior position of interface divider region 2010 is shown at prior position 2106. Note also that select-and-move gesture 2016 starts at prior position 2106 of interface divider region 2010 and ends at final position 2108 of interface divider region 2010. While not illustrated, a user may select to move the interface divider region to an edge of the multi-application immersive environment. In response, block 1904 removes the interface being reduced from the environment.

Note that in this example, multi-application immersive environment 2004 is fully occupied with the immersive interfaces, both prior to and after altering sizes of the immersive interfaces, without unused real estate or real estate occluded with controls for managing the immersive interfaces.

This particular example illustrates one way in which the techniques permit a user to select sizes of immersive interfaces, here to increase a map presented by the mapping application.

The techniques also permit users to "snap" immersive interfaces to automatically fill a predetermined region of multi-application immersive environment 2004. By so doing, gestures and other selections can be used that are fast and easy for users. Further, these regions can have a predetermined size across multiple devices, thereby permitting application developers to prepare for the region sizes. This is especially useful for smaller region sizes, as smaller sizes are often more challenging to present in a user-friendly manner. Consider again FIG. 20, for example, which illustrates a predetermined small-region width 2018 having a width of 320 pixels (though other widths may instead be used). In this example, three widths in which to present content are shown, width 2018, remainder width 2020, and a full width 2022 of multi-application immersive environment 2004. Note that remainder width 2020 can vary across displays, as can full width 2022.

Block 1902 may also enable selection through a drag-and-drop gesture of one of the immersive interfaces from one region to another region. In such a case block 1904 may switch the interfaces between the regions or automatically move a divider (e.g., immersive interface divider 2010 of FIG. 20) such that resulting sizes are switched. By so doing, immersive manager 134 automatically reduces larger immersive interface 2006 to fully occupy a region previously occupied by smaller immersive interface 2008 and vice-versa.

In some cases selection to alter a size of an interface is enabled through an edge gesture. Consider, for example, an edge gesture starting at an edge of larger immersive interface 2006 and having a later point not at the edge of larger immersive interface 2006. Immersive manager 134, alone or in conjunction with gesture handler 128 and/or application manager 130, shrinks larger immersive interface 2006 to a reduced size. Selection to resize interface 2006, then, can be performed by dropping the reduced-size image over smaller immersive interface 2008. In response, immersive manager 134 resizes both interfaces.

Method 1900 describes various ways for managing an immersive interface in a multi-application immersive environment, including altering sizes of multiple immersive interfaces responsive to a single selection. Method 2200 may operate in conjunction with method 1900 and other methods described herein, though using a queue is not required. Therefore, method 1900 is not intended to limit the techniques as described in example method 2200.

Figure 22:
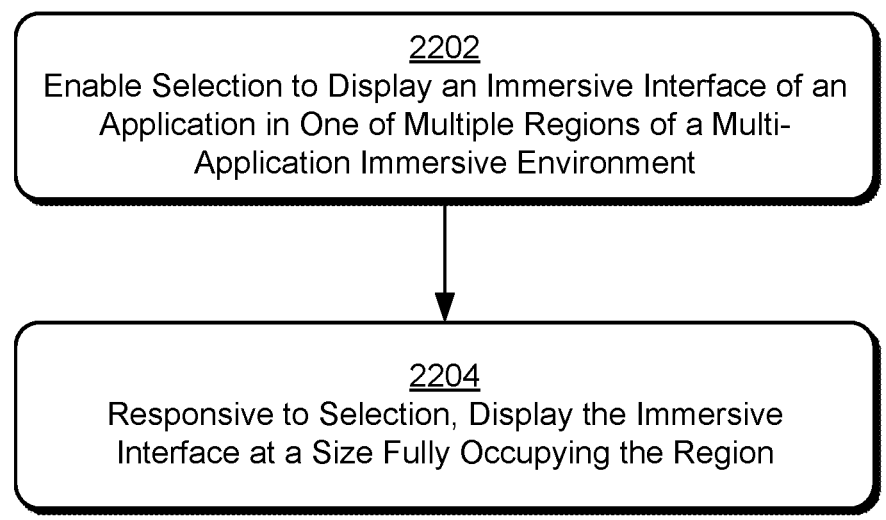
FIG. 22 illustrates a method for displaying an immersive interface of an application in a region responsive to as little as one selection and at a size fully occupying the region.

FIG. 22 depicts a method 2200 for displaying an immersive interface of an application in a region, including responsive to as little as one selection and at a size fully occupying the region. In portions of the following discussion reference may be made to system 100 of FIG. 1, methods 200, 800, 900, 1400, 1700, and 1900, and example embodiments described above, reference to which is made for example only.

Block 2202 enables selection to display an immersive interface of an application in one of multiple regions of a multi-application immersive environment displaying one or more current immersive interfaces of one or more current applications. Block 2202 may do so in various manners described above, such as with an edge gesture or portion thereof, as but one example. Further, the application selected can be a previously-interacted with application determined in various manners, such as by application manager 130 using application queue 132, both of FIG. 1.

The multi-application immersive interface can, at block 2202, present one, two, or even three current immersive interfaces. Thus, block 2202 permits selection of an application to place in regions currently occupied or that exist but are occupied by a larger immersive interface, such as in cases where one immersive interface fully occupies a multi-application immersive environment.

Figure 23:
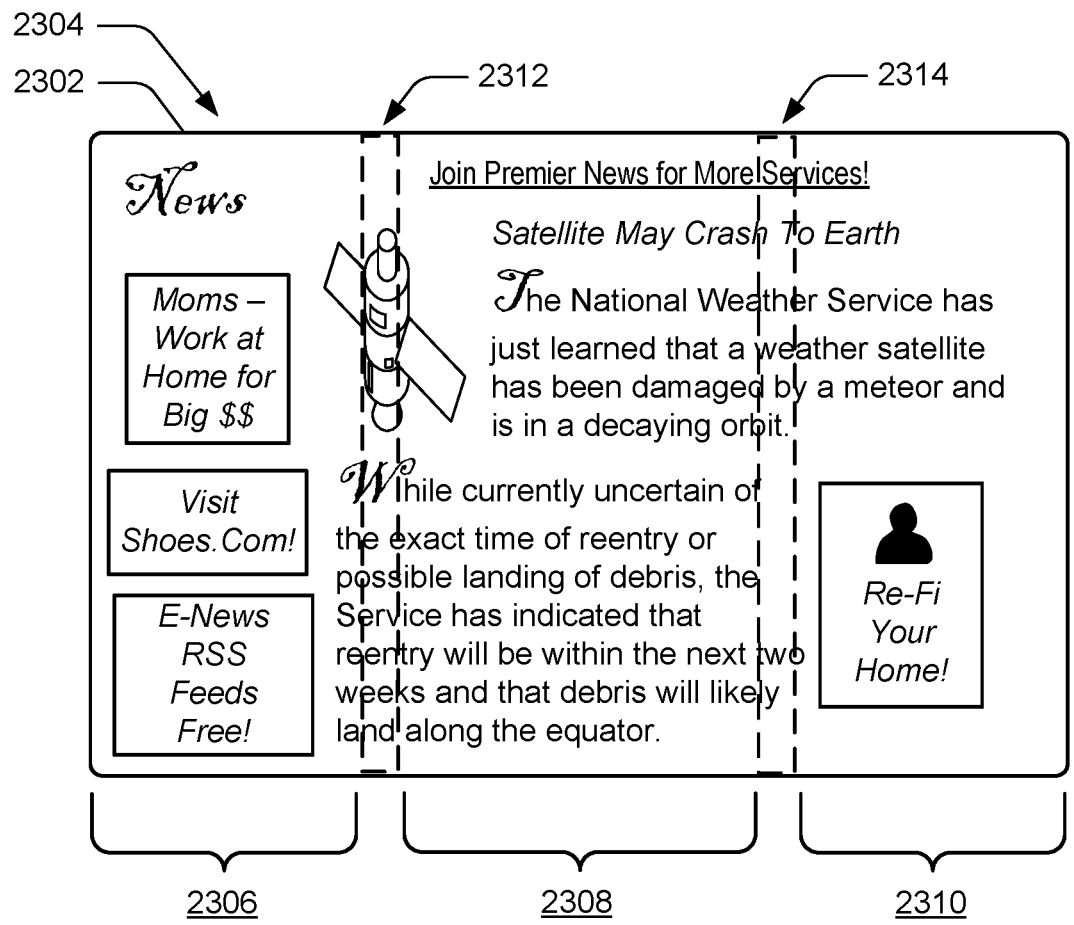
FIG. 23 illustrates a current immersive interface fully occupying a multi-application immersive environment having three regions.

By way of example, consider FIG. 23, which illustrates a current immersive interface 2302 fully occupying multi-application immersive environment 2304. Note here that there are three regions, 2306, 2308, and 2310. These regions may be indicated or not. In cases where an application has been selected and is hovered or moved over one of the regions, the region can be indicated. In one example this indication is made with partially transparent immersive interface dividers 2312 and 2314.

By way of example, assume that immersive manager 134 receives a previously-interacted-with application selected according to method 1700 and following the example illustrated in FIG. 18. In such as case, assume that thumbnail image 1808 for social-networking application 1510 is selected and hovered over region 2306 (not shown but similar to FIG. 18). In response, immersive manager 134 indicates that region 2306 is or is about to be selected and the size of region 2306 by displaying partially transparent immersive interface divider 2312. Alternatively, immersive manager 134 may indicate that region 2306 is or is about to be selected by showing region 2306 as empty, which may include reducing another interface to make room for region 2306.

By way of another example, assume that immersive manager 134 receives selection of a currently displayed immersive interface, such as with an edge gesture starting at a top edge of the currently displayed immersive interface. In response, method 2200 may reduce the size of the displayed immersive interface (e.g., to a thumbnail as noted above), which method 2200 may then permit the user to move progressively with the gesture. On completion of the gesture or a portion thereof, method 2200 may then move the displayed immersive interface and expand it to fully occupy the selected region.

Returning to method 2200, block 2204, responsive to the selection to display the immersive interface in the region, displays the immersive interface at a size fully occupying the region. Note that the user, with a little as the one selection of the application, can select and have presented an immersive interface at a size fully occupying a selected region.

Figure 24:
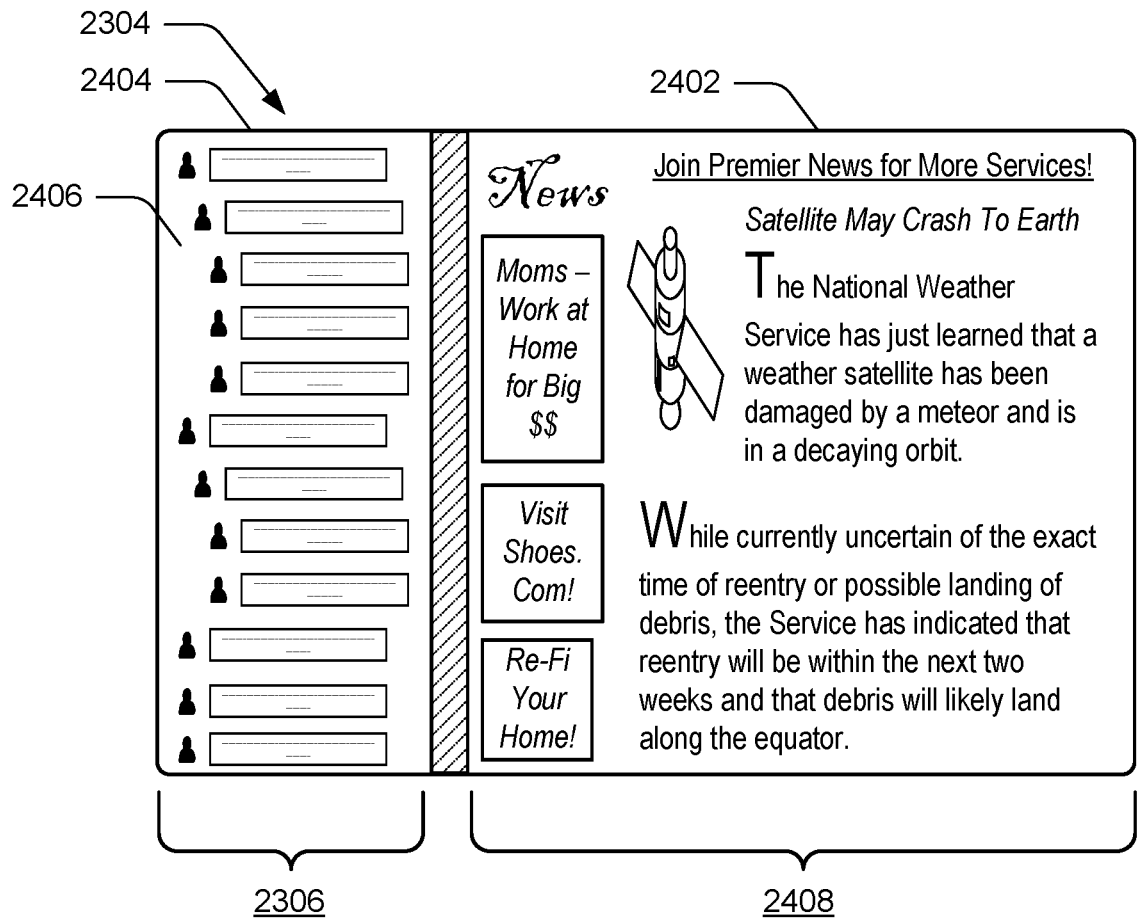
FIG. 24 illustrates the multi-application immersive environment of FIG. 23 with a reduced-size immersive interface instead of the current immersive interface of FIG. 23 and a second immersive interface.

Continuing the example, consider FIG. 24, which illustrates multi-application immersive environment 2304 but now with a reduced-size immersive interface 2402 instead of current immersive interface 2302 of FIG. 23, and with a second immersive interface 2404 showing a social-networking webpage 2406 for social-networking application 1510 of FIG. 15. Second immersive interface 2404 fully occupies region 2306 and without user selection other than selection of the region.

Note that the arrangement of content in reduced-size immersive interface 2402 and social-networking webpage 2406 are both changed. Size changes can be made more quickly or allow for better content arrangements applications and/or developers of those applications having these region sizes in advance, which are provided by the techniques as predetermined region widths. Here the predetermined region width provided is region 2306, though a fill-width region 2408 may also be provided.

Following block 2204, method 2200 may repeat blocks 2202 and 2204, thereby enabling selection of additional immersive interfaces. For example, immersive manager 134 can enable selection of a third immersive interface for presentation in region 2310 or 2308 of FIG. 23. In response to such a selection, immersive manager 134 reduces the size of, or replaces, reduced-size immersive interface 2402. Thus, immersive manager 134 may present two interfaces by replacing one of the two interfaces with a third, selected interface or shrink one or both of the two interfaces to present the third interface.

Note that any of these methods may be combined in whole or in part. Thus, a gesture portion, for example, may be used to select an immersive interface and another portion of the same gesture select to place and/or size the immersive interface. In response to this single gesture, the techniques can resize multiple interfaces currently presented in a multi-application immersive environment.

The preceding discussion describes some methods in which the techniques manage immersive interfaces in a multi-application immersive environment, some other methods that enable switching back to a previously-interacted-with application, and still other methods that describe ways in which the techniques enable and/or use edge gestures. These methods are shown as sets of blocks that specify operations performed but are not necessarily limited to the order shown for performing the operations by the respective blocks.

Aspects of these methods may be implemented in hardware (e.g., fixed logic circuitry), firmware, a System-on-Chip (SoC), software, manual processing, or any combination thereof. A software implementation represents program code that performs specified tasks when executed by a computer processor, such as software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

Example Device

Figure 25:
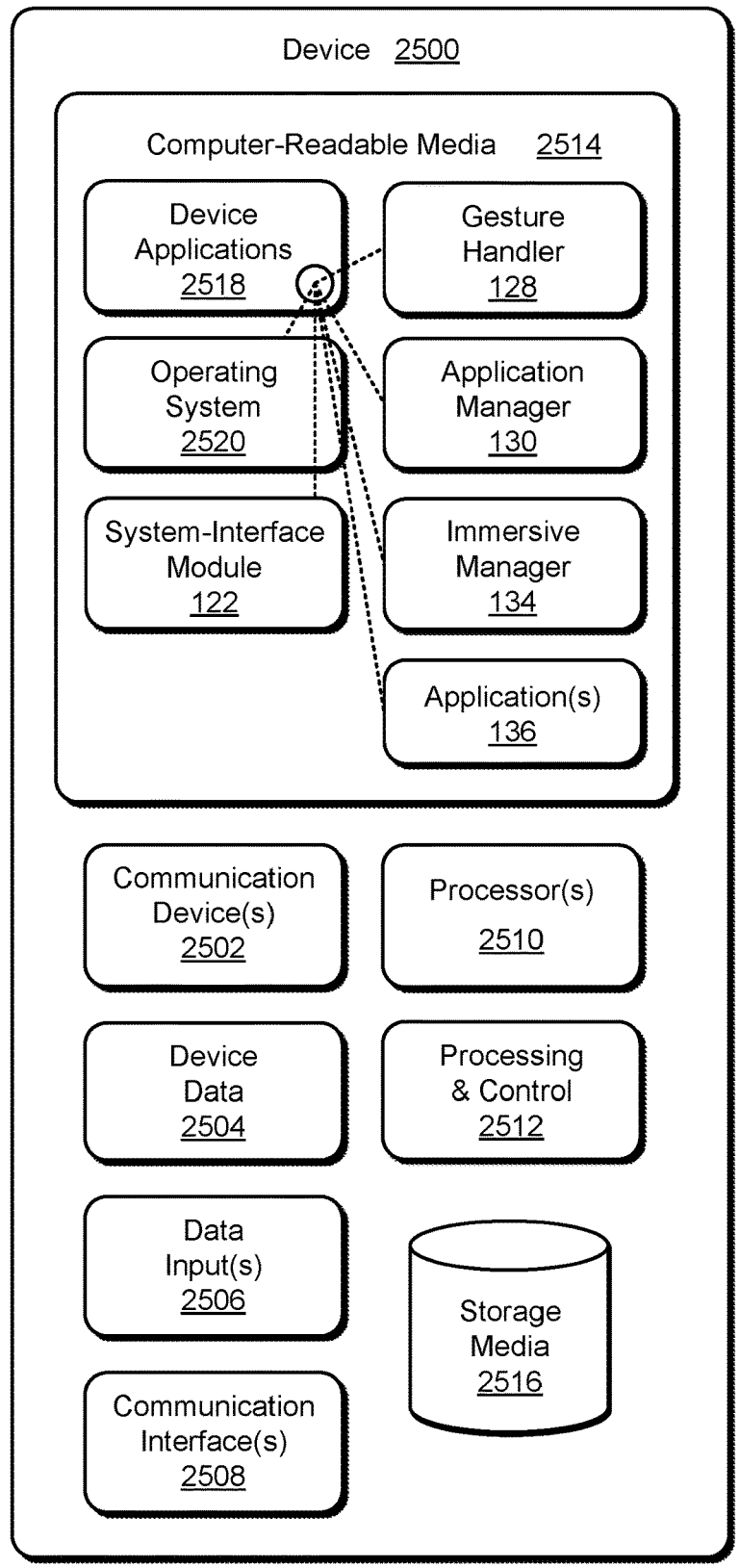
FIG. 25 illustrates an example device in which techniques for managing an immersive interface in a multi-application immersive environment can be implemented.

FIG. 25 illustrates various components of example device 2500 that can be implemented as any type of client, server, and/or computing device as described with reference to the previous FIGS. 1-24 to implement techniques enabling and using edge gestures, switching back to a previously-interacted with application, and/or managing an immersive interface in a multi-application immersive environment. In embodiments, device 2500 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 2500 may also be associated with a user (e.g., a person) and/or an entity that operates the device such that a device describes logical devices that include users, software, firmware, and/or a combination of devices.

Device 2500 includes communication devices 2502 that enable wired and/or wireless communication of device data 2504 (e.g., received data, data that is being received, data scheduled for broadcast, data packets of the data, etc.). The device data 2504 or other device content can include configuration settings of the device, media content stored on the device, and/or information associated with a user of the device. Media content stored on device 2500 can include any type of audio, video, and/or image data. Device 2500 includes one or more data inputs 2506 via which any type of data, media content, and/or inputs can be received, such as user-selectable inputs, messages, music, television media content, recorded video content, and any other type of audio, video, and/or image data received from any content and/or data source.

Device 2500 also includes communication interfaces 2508, which can be implemented as any one or more of a serial and/or parallel interface, a wireless interface, any type of network interface, a modem, and as any other type of communication interface. The communication interfaces 2508 provide a connection and/or communication links between device 2500 and a communication network by which other electronic, computing, and communication devices communicate data with device 2500.

Device 2500 includes one or more processors 2510 (e.g., any of microprocessors, controllers, and the like), which process various computer-executable instructions to control the operation of device 2500 and to enable techniques for managing an immersive interface in a multi-application immersive environment. Alternatively or in addition, device 2500 can be implemented with any one or combination of hardware, firmware, or fixed logic circuitry that is implemented in connection with processing and control circuits which are generally identified at 2512. Although not shown, device 2500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 2500 also includes computer-readable storage media 2514, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 2500 can also include a mass storage media device 2516.

Computer-readable storage media 2514 provides data storage mechanisms to store the device data 2504, as well as various device applications 2518 and any other types of information and/or data related to operational aspects of device 2500. For example, an operating system 2520 can be maintained as a computer application with the computer-readable storage media 2514 and executed on processors 2510. The device applications 2518 may include a device manager, such as any form of a control application, software application, signal-processing and control module, code that is native to a particular device, a hardware abstraction layer for a particular device, and so on.

The device applications 2518 also include any system components or modules to implement the techniques, such as device applications 2518 including system-interface module 122, gesture handler 128, application manager 130, immersive manager 134, and application(s) 136.

Conclusion

Although embodiments of techniques and apparatuses for managing an immersive interface in a multi-application immersive environment have been described in language specific to features and/or methods, it is to be understood that the subject of the appended claims is not necessarily limited to the specific features or methods described. Rather, the specific features and methods are disclosed as example implementations for managing an immersive interface in a multi-application immersive environment.

What is claimed is:

1. A computing device comprising:
a display;
at least one processor; and
memory storing instructions that when executed by the at least one processor cause the computing device to perform operations comprising:
maintaining a queue of multiple interacted-with applications, the queue arranged by most-recently-interacted-with to least-recently-interacted-with applications;
receiving a gesture input;
responsive to the gesture input, proceeding to a particular application in the queue;
displaying a user interface of the particular application; and
updating the queue only when an at least one of an interaction with the user interface of the particular application is received or a threshold time period passes during presentation of the user interface of the particular application.

2. The computing device of claim 1, wherein the gesture input starts at an edge of the display and having a later point not at the edge of the display.

3. The computing device of claim 2, wherein the gesture input has a further successive point at the edge of the display.

4. The computing device of claim 1, wherein based on at least a portion of the gesture, the particular application is either a first-most-recent application in the queue or a second-most-recent application in the queue.

5. The computing device of claim 1, wherein the user interface of the particular application is displayed as at least one of a thumbnail image or transparent overlay over a currently presented user interface of a current application.

6. The computing device of claim 5, wherein the user interface of the particular application is displayed as a thumbnail image and the thumbnail image progressively expands during the receipt of the gesture input.

7. The computing device of claim 5, wherein the thumbnail image is live.

8. The computing device of claim 5, wherein the operations further comprise shrinking the currently presented user interface to a second thumbnail image.

9. The computing device of claim 1, wherein the operations further comprise updating the queue responsive to receiving an interaction with, or a time period passing during presentation of, the user interface of the particular application.

10. The computing device of claim 1, wherein the interacted-with applications include at least two of a social-networking application, a photo application, a web searching application, and a web-enabled media application.

11. A computer-implemented method for switching back to a previously-interacted-with application, the method comprising:
displaying, on a display, a current user interface of a current application;
receiving a gesture input over the current user interface, wherein the gesture input starts at an edge of the display; and
responsive to receiving the gesture input and without further selection;
displaying a thumbnail image of a previous user interface associated with the previously-interacted-with application;
during receipt of the gesture input, progressively expanding the thumbnail image; and
shrinking the current user interface of the current application to a second thumbnail image.

12. The computer-implemented method of claim 11, wherein the thumbnail image corresponding to the previous user interface is displayed as extending from the edge of the display.

13. The computer-implemented method of claim 12, wherein responsive to the gesture input, thumbnail images from multiple previous user interfaces are displayed.

14. The computer-implemented method of claim 11, wherein the gesture input proceeds approximately perpendicularly away from the edge.

15. A computer-implemented method for switching back to a previously-interacted-with application, the method comprising:
- displaying, on a display, a current user interface of a current application;
- maintaining a queue of multiple interacted-with applications, the queue arranged by most-recently-interacted-with to least-recently-interacted-with applications, the queue including a first application and a second application;
- receiving a gesture input over the current user interface;
- responsive to the gesture input, displaying a thumbnail image of a user interface of a particular application in the queue; and
- updating the queue only when an at least one of an interaction with the user interface of the particular application is received or a threshold time period passes during presentation of the user interface of the particular application.

16. The computer-implemented method of claim 15, wherein the gesture input is at least a portion of a first gesture, and the particular application is the first application.

17. The computer-implemented method of claim 15, wherein the gesture input is at least a portion of a second gesture, and the particular application is the second application.

18. The computer-implemented method of claim 15, wherein the gesture input starts at an edge of the display and having a later point not at the edge of the display.

19. The computer-implemented method of claim 18, wherein the thumbnail image extends from the edge of the display.

20. The computer-implemented method of claim 15, wherein the threshold time period is 3 seconds or less.

* * * * *